US005625349A

United States Patent [19]

Disbrow et al.

[11] Patent Number: 5,625,349

[45] Date of Patent: Apr. 29, 1997

[54] ELECTRONIC LOCK AND KEY SYSTEM

[75] Inventors: James E. Disbrow, Palm Bay; Christopher W. Malinowski, Melbourne; Eric L. Smitt, Indian Harbor Beach; Michael R. Mellen; Peter S. Danile, both of Palm Bay; K. N. Singh Chhatwal, West Melbourne, all of Fla.

[73] Assignee: Intellikey Corporation, Melbourne, Fla.

[21] Appl. No.: 444,395

[22] Filed: May 19, 1995

Related U.S. Application Data

[63] Continuation of Ser. No. 174,036, Dec. 28, 1993, abandoned, which is a continuation of Ser. No. 843,998, Feb. 20, 1992, abandoned, which is a continuation of Ser. No. 596,100, Oct. 11, 1990, abandoned.

[51] Int. Cl.[6] .................................................. H04Q 1/00

[52] U.S. Cl. ............................... 340/825.31; 340/825.34; 70/278; 379/103; 361/56

[58] Field of Search ......................... 340/825.31, 825.34; 70/278; 380/28; 379/103; 361/56

[56] References Cited

U.S. PATENT DOCUMENTS

| | | | |
|---|---|---|---|
| 3,812,403 | 5/1974 | Gartner | 340/825.31 |
| 4,766,746 | 8/1988 | Henderson | 340/825.31 |
| 4,789,859 | 12/1988 | Clarkson | 340/825.31 |
| 4,829,296 | 5/1989 | Clark | 340/825.31 |
| 4,908,608 | 3/1990 | Reinke | 340/825.31 |
| 5,140,317 | 8/1992 | Hyatt | 340/825.31 |
| 5,331,325 | 7/1994 | Miller | 341/176 |
| 5,337,588 | 8/1994 | Chhatwal | 70/278 |
| 5,455,571 | 10/1995 | Janssen | 340/825.31 |

*Primary Examiner*—Brian Zimmerman
*Attorney, Agent, or Firm*—Charles E. Wands

[57] ABSTRACT

A system for controllably actuating a lock mechanism has a lock actuator control unit arranged to receive a key and to communicate with a programmable key control unit contained within the key. The lock actuator control unit contains a power supply for supplying power to the key control unit, so that a transfer of communication signals between the key control unit and the lock actuator control unit may take place. A key is configured to engage the lock actuator control unit, the key containing a programmable key control unit which stores information representative of the ability of the key to cause the lock actuator control unit to actuate the lock mechanism and which receives power for its operation from the lock actuator unit.

8 Claims, 35 Drawing Sheets

140

WSB LSB

| | | |
|---|---|---|
| 32 | CHANGE CODE FOR ACCESS AREA 1 | |
| 33 | | |
| 34 | GM CODE 1 | GGM CODE 1 |
| 35 | GGGM CODE 1 | GGGGM CODE 1 |
| 36 | GGGGGM CODE 1 | |
| 37 | COPY CODE 1 | |
| 38 | CHANGE CODE FOR ACCESS AREA 2 | |
| 39 | | |
| 40 | | |
| 41 | | |
| 42 | | |
| 43 | | |
| 44 | CHANGE CODE FOR ACCESS AREA 3 | |
| 45 | | |
| 46 | | |
| 47 | | |
| 48 | | |
| 49 | | |
| 50 | CHANGE CODE FOR ACCESS AREA 4 | |
| 51 | | |
| 52 | | |
| 53 | | |
| 54 | | |
| 55 | | |
| 56 | CHANGE CODE FOR ACCESS AREA 5 | |
| 57 | | |
| 58 | | |
| 59 | | |
| 60 | | |
| 61 | | |
| 62 | CHANGE CODE FOR ACCESS AREA 6 | |
| 63 | | |

FIG. 31

WSB — LSB

| | |
|---|---|
| 64 | |
| 65 | |
| 66 | |
| 67 | |
| 68 | CHANGE CODE FOR AREA 7 |
| 69 | |
| 70 | |
| 71 | |
| 72 | |
| 73 | |
| 74 | CHANGE CODE FOR AREA 8 |
| 75 | |
| 76 | |
| 77 | |
| 78 | |
| 79 | |
| 80 | HOLIDAY 1 |
| 81 | 2 |
| 82 | 3 |
| 83 | 4 |
| 84 | 5 |
| 85 | 6 |
| 86 | 7 |
| 87 | 8 |
| 88 | 9 |
| 89 | 10 |
| 90 | 11 |
| 91 | 12 |
| 92 | 13 |
| 93 | 14 |
| 94 | 15 |
| 95 | 16 |

FIG. 32

| | WSB … LSB |
|---|---|
| 128 | EXTENDED TIMED ACCESS TABLE FOR ACCESS AREA 2 |
| 129 | |
| 130 | |
| 131 | |
| 132 | |
| 133 | |
| 134 | |
| 135 | |
| 136 | |
| 137 | |
| 138 | |
| 139 | |
| 140 | |
| 141 | |
| 142 | EXTENDED TIMED ACCESS TABLE FOR ACCESS AREA 3 |
| 143 | |
| 144 | |
| 145 | |
| 146 | |
| 147 | |
| 148 | |
| 149 | |
| 150 | |
| 151 | |
| 152 | |
| 153 | |
| 154 | |
| 155 | |
| 156 | EXTENDED TIMED ACCESS TABLE FOR ACCESS AREA 4 |
| 157 | |
| 158 | |
| 159 | |

FIG. 34

| | WSB … LSB |
|---|---|
| 160 | |
| 161 | |
| 162 | |
| 163 | |
| 164 | |
| 165 | |
| 166 | |
| 167 | |
| 167 | |
| 169 | |
| 170 | EXTENDED TIMED ACCESS TABLE FOR ACCESS AREA 5 |
| 171 | |
| 172 | |
| 173 | |
| 174 | |
| 175 | |
| 176 | |
| 177 | |
| 178 | |
| 179 | |
| 180 | |
| 181 | |
| 182 | |
| 183 | |
| 184 | EXTENDED TIMED ACCESS TABLE FOR ACCESS AREA 6 |
| 185 | |
| 186 | |
| 187 | |
| 188 | |
| 189 | |
| 190 | |
| 191 | |

FIG. 35

| | WSB ... LSB |
|---|---|
| 192 | |
| 193 | |
| 194 | |
| 195 | |
| 196 | |
| 197 | |
| 198 | EXTENDED TIMED ACCESS TABLE FOR ACCESS AREA 7 |
| 199 | |
| 200 | |
| 201 | |
| 202 | |
| 203 | |
| 204 | |
| 205 | |
| 206 | |
| 207 | |
| 208 | |
| 209 | |
| 210 | |
| 211 | |
| 212 | EXTENDED TIMED ACCESS TABLE FOR ACCESS AREA 8 |
| 213 | |
| 214 | |
| 215 | |
| 216 | |
| 217 | |
| 218 | |
| 219 ↓ | |
| 220 | |
| 225 | |
| 226 ↓ | UNUSED |
| 255 | UNUSED |

FIG. 36

ELECTRONIC LOCK AND KEY SYSTEM

This is a continuation of application Ser. No. 08/174,036, now abandoned, filed Dec. 28, 1993—; which is a continuation of U.S. Ser. No. 07/843,998; filed Feb. 20, 1992—abandoned; which is a continuation of U.S. Ser. No. 07/596,100, filed: Oct. 11, 1990—abandoned.

This application is related to an application entitled Electronic Lock and Key System filed in the name of Singh Chhatwal on even date herewith, the contents of which are incorporated by reference herein to the extent necessary.

FIELD OF THE INVENTION

The present invention relates to an electronic key and lock system, and specifically, to an electronic key and lock that has intelligence in each of the key and lock.

BACKGROUND OF THE INVENTION

The use of electronic locks in industries such as the hotel industry and others is increasing. Electronic locks provide for increased security since the lock can be reprogrammed so that it will not accept keys which it would previously accept. This is important in the hotel industry, for example, in which access to a room by a former guest should be prevented. It can also be important in plants in which certain areas of the plant will have limited access, taking on more importance when an employee leaves.

An electronic lock and key system also has the advantage of not using a mechanical key which can be easily duplicated.

While existing electronic locks and keys have many advantages over mechanical locks and keys, some problems remain. One of these problems relates to the security of the system. Most keys used in electronic lock and key system employ a memory circuit in the key which is interrogated by the electronic lock. It is entirely possible for such a memory circuit to be interrogated by an enterprising thief to compromise the security of the electronic lock and key system.

Another problem with existing lock and key systems is the amount of power needed by the lock for operation. If powered by a battery, such locks cause the battery to have a low battery life such that the battery needs to be frequently replaced.

A still further problem with existing lock and key systems relates to the ease of programmability of the lock. The known systems require a bulky programming unit which must be physically transported from lock to lock in order to reprogram the lock.

Another problem noted with existing electronic locks is the installation of the lock electronics (or some portion of them) on the outside of the door. This compromises security of the lock, as well as detracts from the aesthetic appeal of the door.

With known electronic locks, the entire lock mechanism within a door would need to be replaced and the door modified in order to accommodate the use of the electronic lock. This does not allow for the retrofitting of existing doors to have an electronic lock, without incurring a relatively great expense.

In known electronic lock and key systems, the key is made to operate only the electronic lock of the system. However, it is useful to operate a variety of different locks with a single key, and some of these locks may be mechanical. It would therefore be advantageous for a key to be able to operate both an electronic lock as well as cut for use in conventional mechanical locks.

With electronic locks, there is occasionally the need for the supplying of external emergency power to operate the lock/key. However, this raises the possibility of the compromising of the security of access. There is thus a need for a lock/key which can be supplied with power externally in an emergency, without compromising security of access.

There is a need for a lock and key system which solves the above-described problems and presents a system that ensures the security of a system while providing the flexible features of an electronic lock and key system.

SUMMARY OF THE INVENTION

These and other needs are provided by the present invention which is an electronic lock and key system having a lock and key that both contain an on-board microprocessor and non-volatile RAM. The key is powered externally from the lock mechanism through a metallic/insulator layer layout of the blade of the key when the key is inserted into the lock mechanism. Communications between the control circuitry within the key and the circuitry within the lock are carried out by way of respective infrared emitter and optical detector units. Also, other means of communication, such as magnetic, electromagnetic or radio frequency can be employed as well. The key blade is simply used as a mechanical support for conductor highways through which the key is powered.

The lock electronics compartment within the door also contains a battery, microprocessor and associated memory and other circuitry, as well as an external communication port for effecting digital communications with a remote supervisory terminal/storage facility.

All communications between the key and the lock mechanism are encrypted, with precursor verification codes necessary before the lock mechanism will respond to the insertion of the key. Security is further enhanced by a requirement that the current drawn by the key falls within a specific preprogrammed window. This prevents battery drain caused by insertion of a foreign metallic object other than the key into the keyway of the lock. Because both the key and the lock contain intelligence, they can be programmed for a selective access and alteration in substantially an infinite number of ways. Furthermore, both the key and the lock will store information regarding the location and the times of insertions of the key into various locks. This is important when attempting to determine when access to a particular lock was attempted and by what key.

One of the advantages of the present invention is that the locks contain means for communicating with a central database, which allows programming and control from this central database. This communication can take place, for example, via telephone lines. To allow the lock and keys to be easily reprogrammed, thereby eliminating the need for highly trained locksmiths, the present invention provides for portable remote programmers that can be taken to the lock site to reprogram the lock in a user friendly manner.

Another advantage of the present invention is that the identities assigned to the keys and the locks are kept in databases. Whenever an identity is assigned to a key or lock, and this identity is electronically embedded into the key or lock, the programming device which assigned the identity automatically records the identity in a database. This ensures maintenance of a record of all of the assigned identities of keys and locks that exist.

The present invention also provides for very low current consumption by the lock through the use of a method for putting the lock to sleep and waking up the lock to perform its functions for brief periods of time. This extends the battery life such that a single battery may not need to be replaced for periods as long as one to two years.

Other objects, advantages and novel features of the present invention will become apparent from the following detailed description of the invention when considered in conjunction with the accompanying drawings.

BRIEF DESCRIPTION OF THE DRAWINGS

FIG. 31 shows the second page of memory for the NVRAM of the key of FIG. 3.

FIG. 32 shows the third page of memory for the NVRAM of the key of FIG. 3.

FIGS. 34–36 show the fifth through seventh pages of memory for the NVRAM of the key of FIG. 3.

DETAILED DESCRIPTION OF THE DRAWINGS

Figure 1:
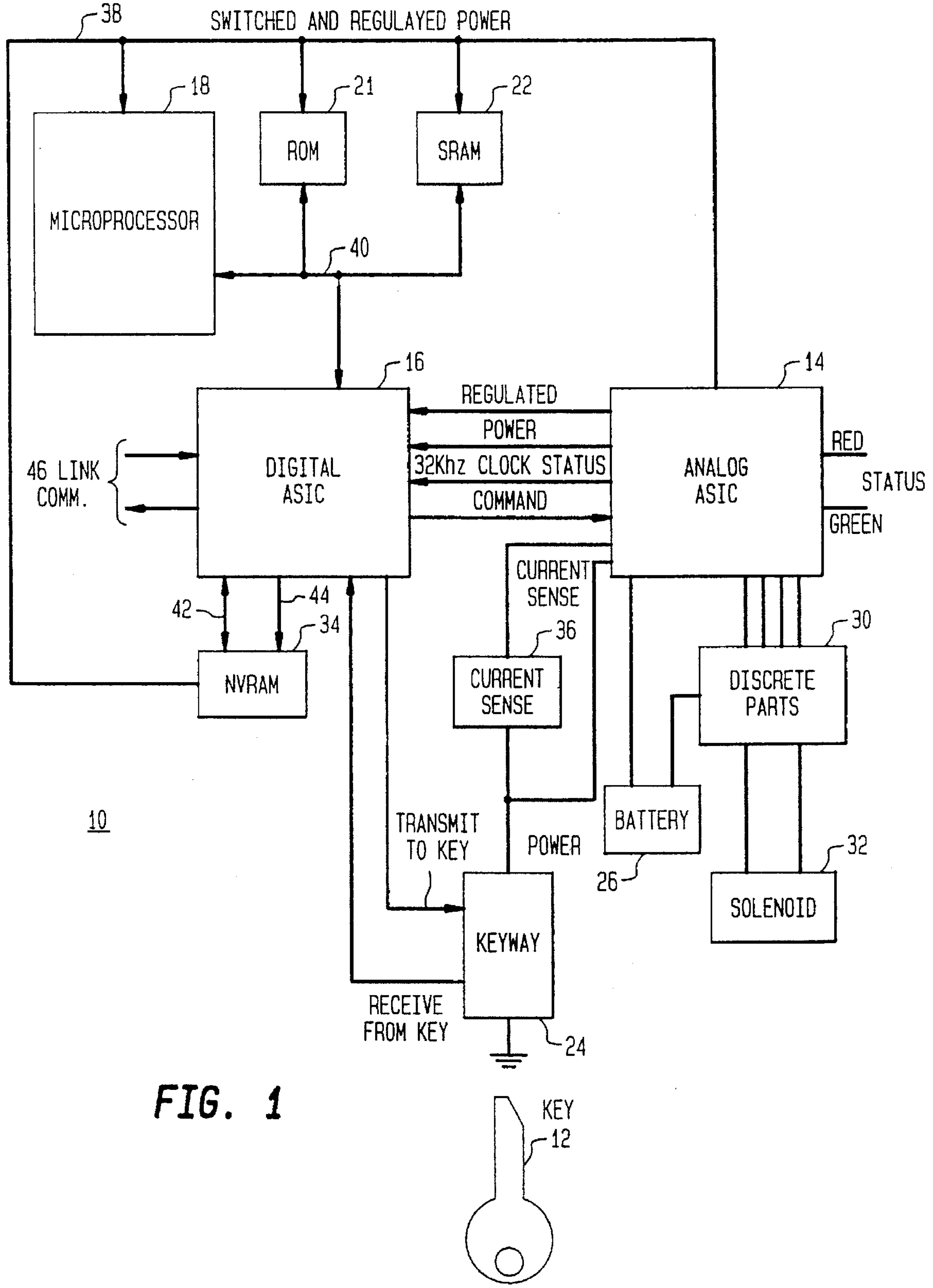
FIG. 1 is a block diagram of the electronic lock according to an embodiment of the present invention.

FIG. 1 illustrates in block diagram form a lock 10 constructed in accordance with an embodiment of the present invention. The lock 10 can be locked and unlocked with a key 12, schematically depicted in FIG. 1. The lock 10 comprises a number of interconnected components, which will first be described briefly, and then in more detail.

The lock 10 has an analog Application Specific Integrated Circuit (or AASIC) 14 and a digital ASIC (or DASIC) 16. The AASIC 14 controls the power distribution of the components of the lock 10, and performs input sampling to detect external stimuli to the lock electronics. In order to minimize current consumption and extend battery life for the lock 10, the AASIC 14 samples inputs at a specific data rate, and only powers up comparators and operational amplifiers during the sampling period. The AASIC 14 provides switched and regulated power to a number of components of the lock 10 via a power bus 38. These components include a microprocessor 18, a read only memory (ROM) 20 and a static random access memory (SRAM) 22. Regulated power is provided by the AASIC 14 to the DASIC 16 and to a keyway 24 that receives the key 12 and which serves as the interface between the lock 10 and the key 12.

The AASIC 14 receives power from a battery 26, that is for example, a standard nine volt alkaline battery source rated for 550 mAh. Power to the AASIC 14 can also be supplied from an external key 12 to supply voltage in the event the internal battery 26 dies, using a diode isolator (not shown) to the external power source. The maximum input current is approximately 35 mA, while the standby operating current is approximately 55 microamps maximum, nearly a thousand times less current. Battery replacement can occur, when inserting a key that has external power applied. The lock 10 will receive power through the external power source, allowing the internal battery 26 to be changed.

The AASIC 14 provides power to status indicators, illustrated in FIG. 1 as red and green light emitting diodes (LEDs) 28. Power is also supplied to discrete electronic parts 30 that drive solenoid 32. A latch bolt (not shown) is able to be thrown when a pin coupled to the solenoid 32 does not block the movement of the latch bolt/cam, and is unable to be thrown when the pin blocks the movement of the latch bolt/cam. Thus, the movement of the pin as controlled by the solenoid 32 relative to the latch bolt determines whether the lock 10 is in the locked or unlocked state.

The DASIC 16, like the AASIC 14, is coupled to the microprocessor 18, the ROM 20, and the SRAM 22, but via a data and address bus 40. The DASIC 16 is also coupled to a non-volatile random access memory (NVRAM) 34 via a bidirectional data line 42 and a clock line 44. It is determined by the contents of the data line 42 as it is being clocked from CLK 1 through CLK 8 what address in NVRAM 34 is being addressed, as well as whether a read or write is being performed. The clock on the clock line 44 is generated through microprocessor code in a known fashion. The NVRAM 34 is supplied with power by the AASIC 14.

The DASIC 16 transmits data signals to and receives data signals from the key 12 via the keyway 24.

A current sensor 36 is coupled between the keyway 24 and the AASIC and provides a measurement of the current flowing between the keyway 24 and the AASIC 14. There is a window current that is necessary to cause the AASIC 14 to "wake up" the DASIC 16. The current must be between, for example, 7.5 mA and 36.5 mA. If the current is not within this window, the lock 10 will not operate, and other action, such as setting off an alarm, can be taken. The details of how the current is determined to be within this window will be provided later.

The lock 10 communicates to the outside world through the keyway 24 and also through link communication ports 46 of the DASIC 16. One of the ports 46 is an output port that sinks up to 10 mA and feeds an infrared (IR) LED built into the keyway 24. The receive port of the ports 46 has a phototransistor fed into it. When the information received in the phototransistor produces a voltage drop on the receive port 46 greater than 2.5 volts, a signal is deemed to be present.

The AASIC 14 provides a 32 kHz clock to the DASIC 16 and status signals, along with the regulated power mentioned earlier. This precision clock allows the DASIC 16 to set up a real-time clock, an interrupt structure and LED indicator control signals.

The status signals include threshold detect signals, and a PLACE signal. The threshold signals are sent to the DASIC 16 when the AASIC 14, which is monitoring the condition of the battery 26, determines that the battery 26 is getting weak. There are three thresholds of weakness, and the threshold status signals inform the DASIC 16 of the weakness threshold. The DASIC 16 will then cause the AASIC 14 to drive the LEDs 28 in a specific manner that will indicate to a human the weakness of the battery.

Another status signal sent by the AASIC 14 to the DASIC 16 is the PLACE signal. The receipt of this signal is an indication that the power in the keyway 24 is appropriate (i.e. within the window). This "wakes up" the DASIC 16 from a "sleep state". The DASIC 16 will then send a command signal to the AASIC 14 that commands the AASIC 14 to turn on the power for the lock 10. Until this point, the AASIC 14 has been operating with a very low current draw (under 50 microamps) while only periodically (every 62 msec) issuing a 5 volt sampling pulse of 62 microsecond duration. In this way, the power consumption of the lock 10 is kept very low and the battery life will be relatively long (e.g. 3 years).

Once the AASIC 14 turns on the power for the lock 10, also providing power to the key 12 via the keyway 24, a handshake between the key 12 and the lock 10 takes place. It is the DASIC 16 that controls this communication.

The microprocessor 18 has as a microprocessor core, for example, a Z-80 (CMOS version 84C00) packaged in a 44 PLCC. The CMOS version offers fully static operation, so that the electronics of the lock 10 can be "put to sleep" whenever it is not in actual usage. The microprocessor 18 is used to control all peripheral functions such as key detection, combination accessing, pattern recognition, control of solenoid functions, control of alarm circuitry, and bidirectional communications back to the keys. The clock rate for the microprocessor 18 is set near 3.5 MHz, which guarantees interrupt response in less than 5 msec after a stimulus to the system.

The ROM 20 can be, for example, a 32K×8 CMOS ROM. The ROM 20 is a low power CMOS integrated circuit containing the operating system for the lock 10. Simple changes in the ROM 20 provide options or enhanced features since most of the electronics for the lock 10 are contained in the AASIC 14 and the DASIC 16.

The SRAM 22 is a 2k×8 static CMOS RAM, upgradable to 8K×8 static CMOS RAM. The SRAM 22 functions as a scratchpad.

The NVRAM 34 in the lock 10 is, for example, at least a 512×8 non-volatile RAM, and is used to store combinations, operational parameters and features, and manufacturing tracking information. The size of the NVRAM 34 can be enlarged to provide for increased storage capacity in embodiments of the invention.

Figure 2:
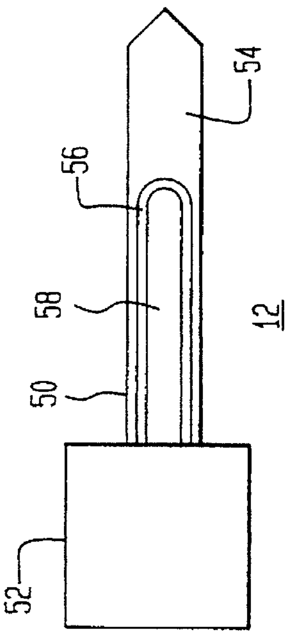
FIG. 2 shows a physical configuration of the key according to an embodiment of the present invention.

Before describing the components of the lock 10 in further detail, the key 12 will be described. The physical structure of the key is shown in FIG. 2 and comprises a blade 50 and a handle 52. The handle 52 contains the electronics for the key 12. The end of the blade 50 forms a negative pole 54, while an interior exposed section forms a positive pole 58, with an insulating section 56 formed between the poles 54 and 58.

Figure 3:
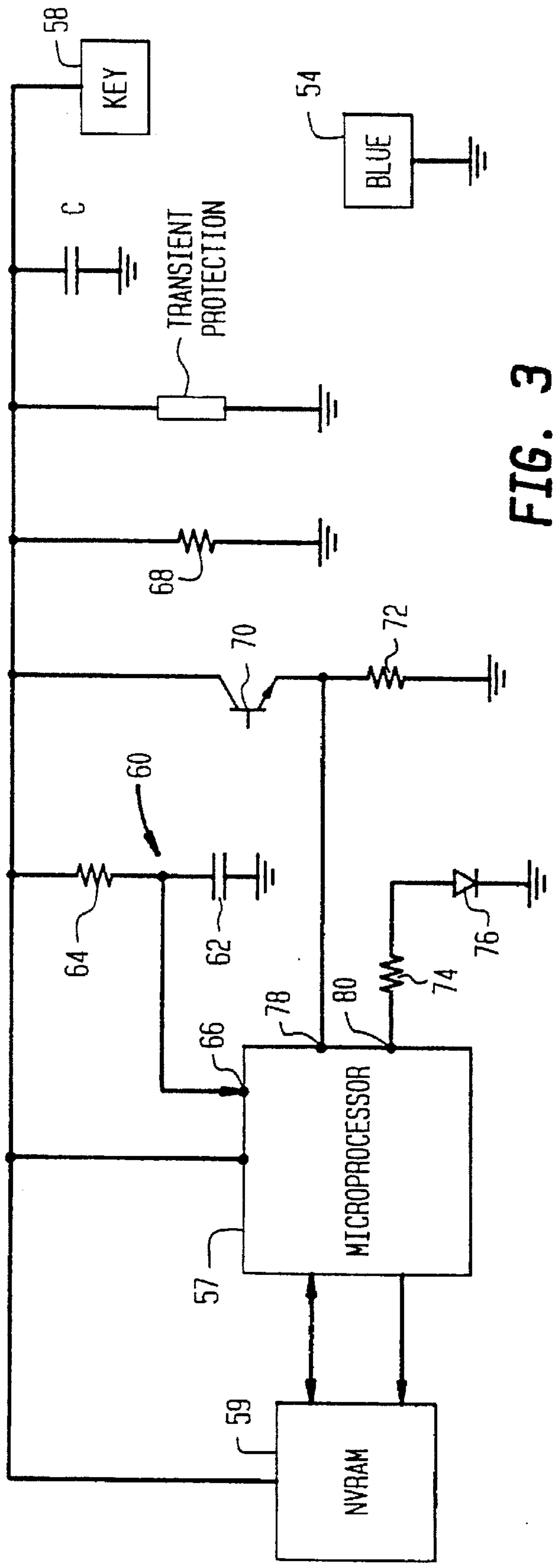
FIG. 3 shows a block diagram of the electronics of the key according to an embodiment of the present invention.

The electronic components of the key 12 are schematically illustrated in FIG. 3. The key 12 is a complete microprocessor system with full asynchronous communications, mounted on a miniature circuit board.

The key 12 has a microcontroller 57, which in the illustrated embodiment, is a 68HC05C4FB part, although most other microcontrollers can be used. Such a microcontroller 57 is an 8-bit microcontroller, with 4156 bytes of masked ROM and 176 bytes of SRAM. It is fully static and can be placed in a sleep mode, with the clock being shut off from a software command.

The microcontroller 57 has an internal oscillator block, which allows an external resistor connected between the oscillator pins to determine operating frequency. It also has a timer system and four I/O ports, PA, PB, PC, and PD. The ports PA, PB, and PC are programmable and may be configured as either input or output. Port PD is fixed and functions as a special purpose input/output port.

In the illustrated embodiment, only port PA is used, and this port PA couples a NVRAM 59 to the microcontroller 57 to establish a bidirectional link for data, address and command information between the microcontroller 57 and the NVRAM 59.

An RC circuit 60 is coupled to the positive pole 58 and to a RESET input 66 of the microcontroller 57. The RC circuit 60 has a power-up reset capacitor 62 and a resistor 64 coupled in series between the positive pole 58 and ground. A resistor 68, which can be 620 ohms, establishes an initial load current that is near, but less than, the minimum required window current discussed earlier. In the illustrated embodiment, this minimum window current is 7.5 mA. Thus, when the microcontroller 57 starts operating, the operating current of the microcontroller 57 plus the load current will exceed the minimum window current, and will generate a PLACE signal that will wake up the AASIC 14. The resistor 68 also provides a discharge for the power-up reset capacitor 62.

The key 12 receives information from the lock 10 via a BPW-85 NPN epitaxial planar phototransistor 70 in a common collector mode, with a 2.21 ohm resistor 72 serving as the emitter load. The received signal is fed directly to an input port (RDI) 78 of the microcontroller 57.

The key 12 transmits information with an infrared LED 76 that is, for example, a high efficiency GaAs LED that operates in 910 nanometer wavelength, TSUS-3400. Current for the LED 76 is supplied directly from an output port (TXD) 80 of the microcontroller 57, and is limited to under 5 mA by a 511 ohm series resistor 74.

Upon insertion of the key 12 into the keyway 24, the key 12 is energized, and the RC circuit 60 charges. This holds the RESET input 66 low, or active, for a period determined by the RC circuit (about 0.1 second). The power-up reset capacitor 62 holds charge until the key 12 is removed from the keyway 24 or voltage is removed from keyway contacts via system shutdown or normal power down routines. The discharge path for power-up reset capacitor 62 is through the resistor 68.

Upon charging, the microcontroller 57 executes a power-up sequence, and executes code located in power-up locations in the ROM of the microcontroller 57. This operation verifies proper internal operation for the microcontroller 57. The reset is the only initialization mechanism. The microcontroller 57 then executes a number of routines, described below.

The program executed by the microcontroller 57 waits for serial data at the RDI input port 78. (A signal greater than or equal to 1.2 volts indicates that IR information is being received.) The serial data received are the IR signals from the lock 10. Once the microcontroller 57 verifies correct IR data, a "seed" is sent from the lock 10. This seed is used in the encryption algorithm of the present invention, and insures data integrity and protection on this link. An example of a suitable encryption algorithm is a "one-time pad" encryption algorithm. Every communications transfer over the link between the key 12 and the lock 10 requires acknowledgement by the receiving node. Retry and failure mechanisms are also provided in the software for the microcontroller 57.

The microcontroller 57 of the key 12 responds to the receipt of a seed by sending basic encryption data which the lock 10 uses to decrypt the key data. The key 12 then waits for encrypted transmissions from the lock 10, requesting data that is stored in the NVRAM 59 of the key 12. The microcontroller 57 uses port PA to communicate to the NVRAM 59 in a serial format, requesting specific data from a NVRAM memory location. The microcontroller 57 receives this specific data, and encrypts the data prior to sending the data on the TDO output port 80. The TDO output port 80 drives the infrared LED 76 through the current limiting resistor 74. The infrared energy from the key 12 is limited to 5 mA current.

The key 12 and the lock 10 operate in a loop, until all the required data is sent from the key 12 to the lock 10. At the completion of the data transmission, the key 12 enters a wait loop, for additional commands from the lock 10. If the intelligence in the lock 10 determines that the data received is within the correct format or limits, the DASIC 16 causes the AASIC 14 to energize the solenoid 32 for a period of time, for example, 50 msec. The key 12 is then commanded by the lock 10 to finish, at which point the key 12 enters the "sleep mode". The total current drain for the key 12 drops below the limit for a valid PLACE indication, and power is removed from the keyway 12.

If the lock 10 determines that the data is not within the prescribed limit to operate the solenoid 32, an additional operation may be required, such as commanding the key 12 to reprogram some or all of the contents of NVRAM 59. Upon completion of the changing of the contents of the NVRAM 59, the lock 10 will command the key 12 to finish, at which point the key 12 enters the sleep mode. Again, the total current drain for the key 12 drops below the prescribed limit for a valid PLACE indication (i.e. below the minimum required window current). Power is then removed from the keyway 24.

The lock 10 can operate in a mode in which the key insertions are tracked. The lock 10 will operate the solenoid 32, but will also write a lock identification (ID) back to the NVRAM 59 of the key 12, so that the key 12 will contain information as to the last lock into which this particular key 12 was inserted. As before, upon completion of the changing of the contents of the NVRAM 59, the key enters the sleep mode and power is removed from the keyway 24.

Figure 4:
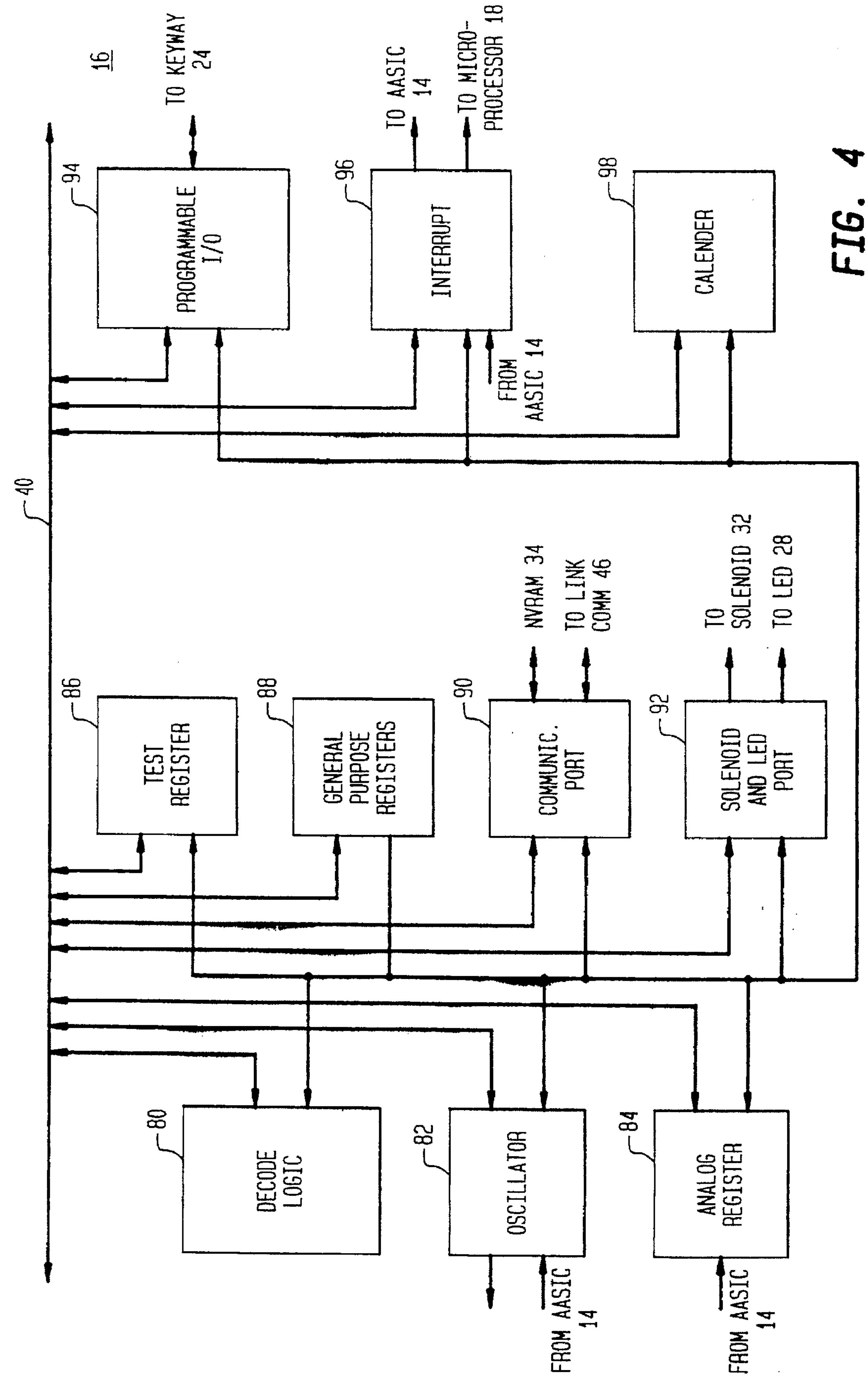
FIG. 4 is a block diagram of a digital ASIC (DASIC) of the lock of FIG. 1.

The following is a description of the DASIC 16 of the lock 10. This DASIC 16 comprises a number of components, as seen in block diagram form in FIG. 4, coupled to the bus 40 on which data, commands and addresses are carried. Other connections from the DASIC 16 to various components of the lock 10 are indicated in FIG. 4.

Figure 5:
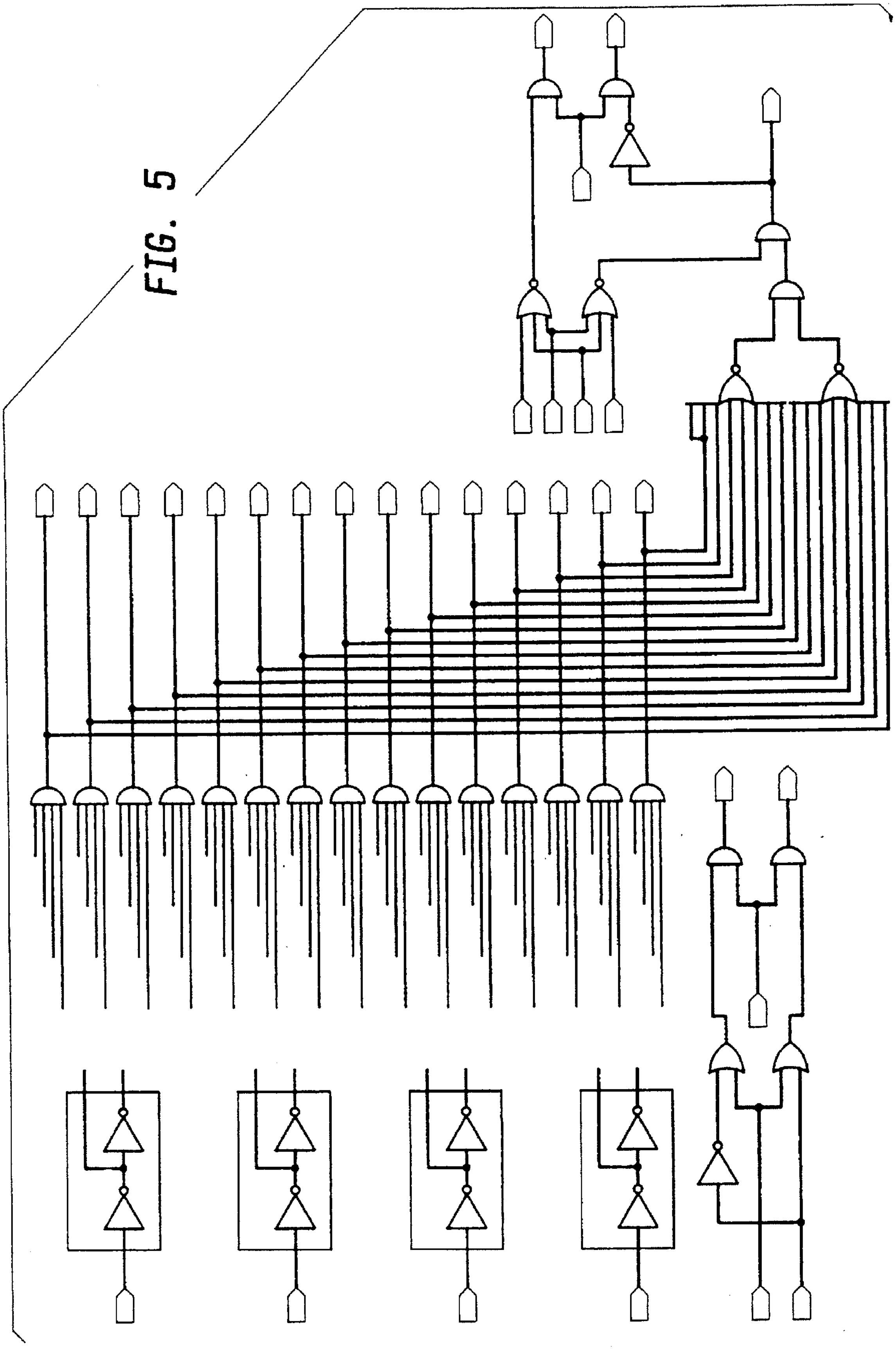
FIG. 5 shows a logic diagram of a decode block of the DASIC of FIG. 4.

The DASIC 16 includes a decode logic block ("decode") 80. The decode 80 operates to break down or decode an address, memory requests, I/O requests, read/write requests to provide all of the internal commands for the DASIC 16 and the SRAM 22 and the ROM 20 selects. A more detailed diagram of the decode 80 is provided in FIG. 5, which illustrates the arrangement of logic gates that comprise the decode 80.

An initial block 82 of the DASIC 16 is coupled, in addition to the bus 40, to the microprocessor 18 and the AASIC 14. The initial block 82 receives a 32 kHz clock from the AASIC 14 and provides this clock to other components in the DASIC 16, such as an analog register 84, an interrupt block 96 and a calendar 98. The initial block 82 also provides the microprocessor 18 with a Z80 clock signal. An example of logic circuitry that will perform the functionality of the initial block 82 is illustrated in FIG. 6.

Figure 6:
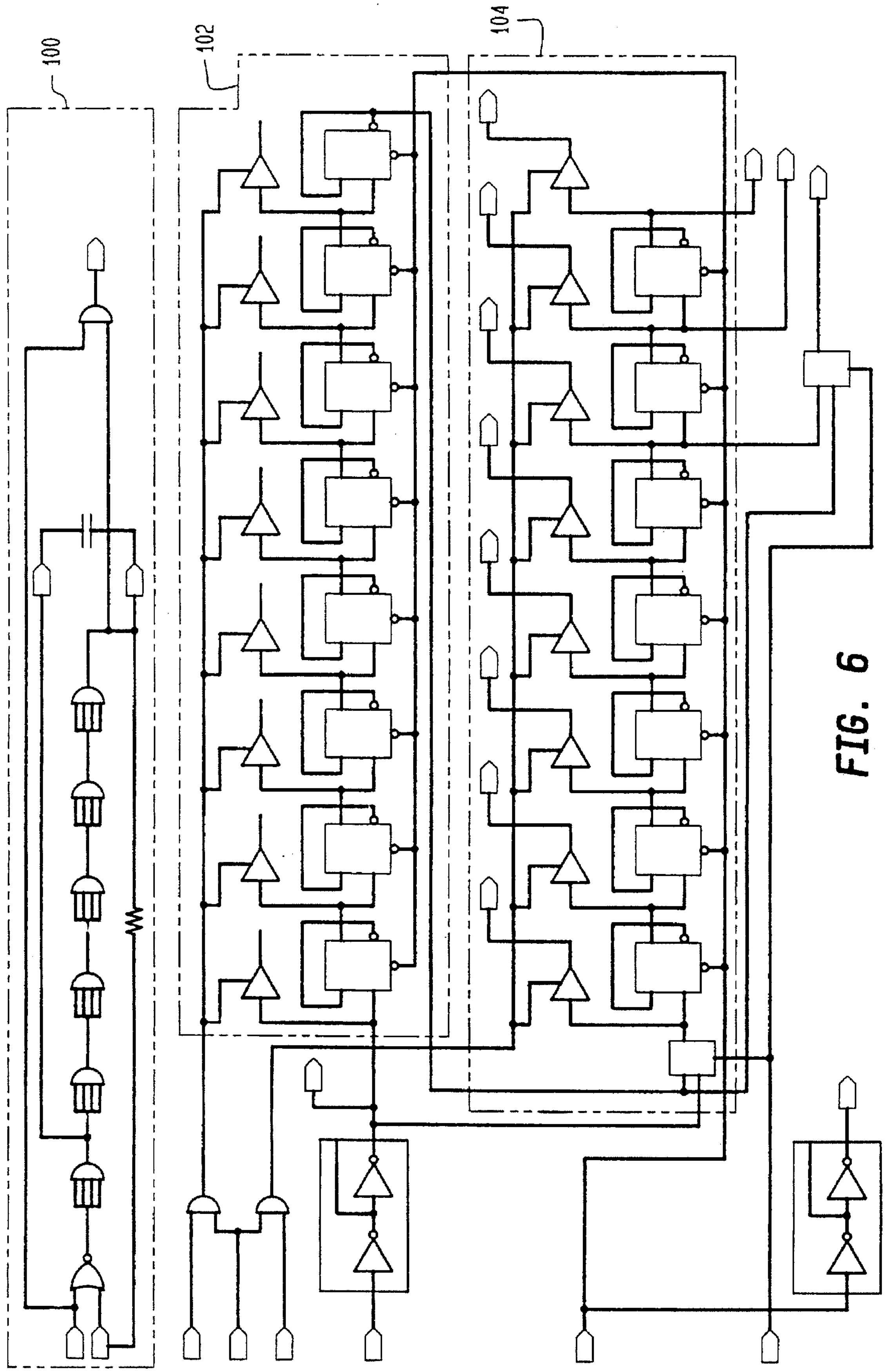
FIG. 6 shows a logic diagram of an initialization circuit of the DASIC of FIG. 4.

As seen in FIG. 6, the initial block 82 has a start/stop oscillator 100, and two register blocks 102, 104. The clock signal from the AASIC 14 is fed into the register blocks 102, 104 which comprise divide registers that have outputs that can be read. The start/stop oscillator produces the Z80 clock. The oscillator 100 can be started and stopped by a signal (START). The oscillator 100 is a free-running oscillator. Starting and stopping the oscillation prevents current consumption through the oscillator 100 when the lock 10 is not powered, this consumption being approximately 3–4 mA.

The output of the two register blocks 102, 104 are one Hz, two Hz, and four Hz. A test function places the two register blocks 102, 104 in a parallel mode to get a higher frequency output. As stated before, the outputs of the counters of the register blocks 102, 104 are readable. The contents of the counters can be placed on the bus 40 and used then to produce a random number seed, the use of this seed being discussed earlier. In other words, the microprocessor 18 reads the counters at a random time and produces a random number, used as the seed in the encryption method.

Figure 7:
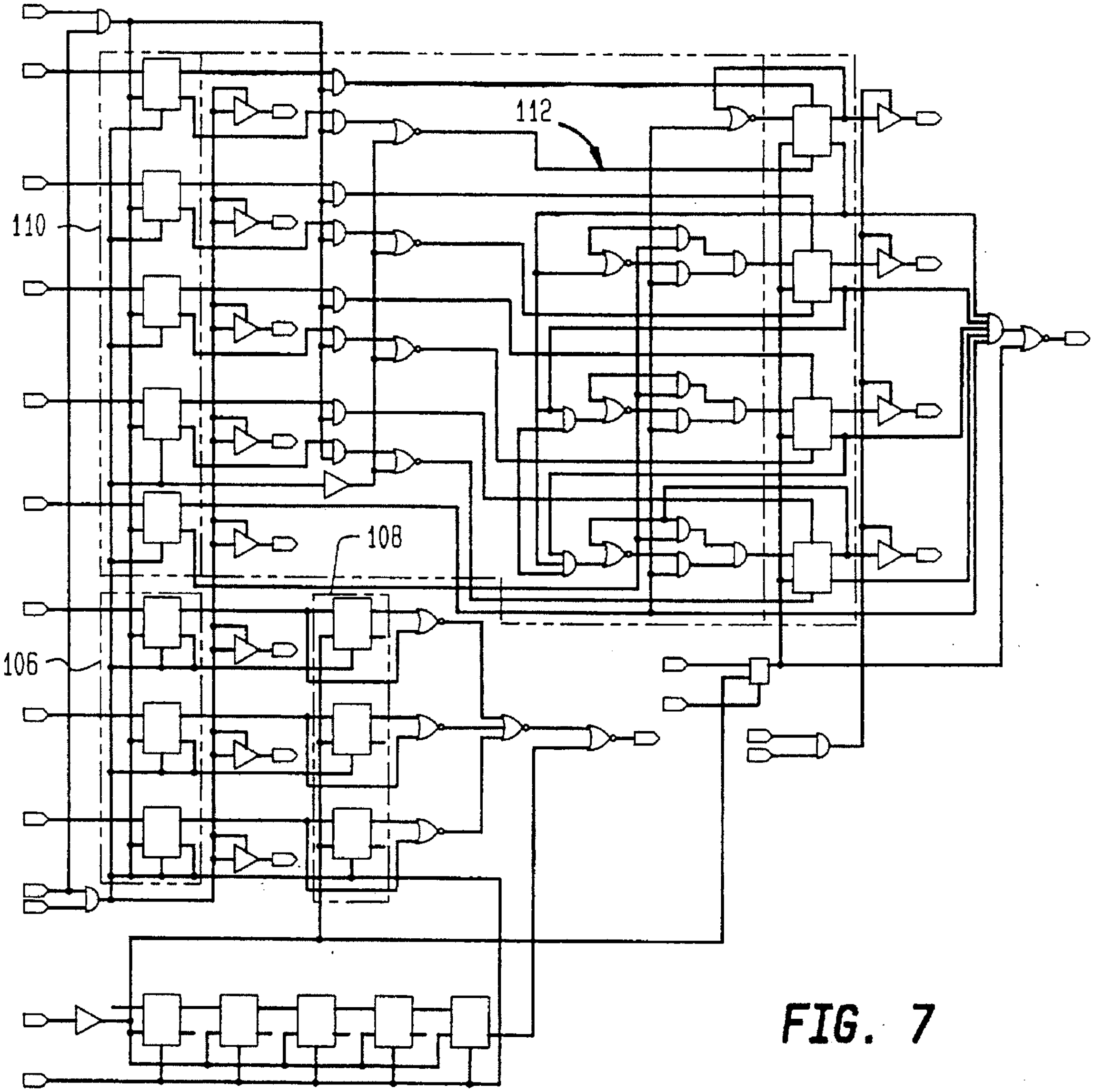
FIG. 7 is a logic diagram of an analog register of the DASIC of FIG. 4.

An analog register 84 is coupled to the bus 40 and to the AASIC 14. The analog register 84 receives three threshold signals from the AASIC 14 and discriminates a change in the status of the battery strength with these signals. A change in the status of the battery 26 will cause the analog register 84 to generate a signal to the interrupt block 96, which will create an interrupt that will cause the appropriate indication of the battery status via the LEDs 28. A diagram showing the logic gates which comprise the analog register 84 is shown in FIG. 7.

The analog register 84 has two functions. The three threshold signals are clocked into a three-bit wide register 106, and the output of this register 106 is clocked into a second three-bit wide register 108 at another 32 kHz time period. The contents of the register 106 are compared to the contents of register 108, and if they match, none of the three threshold signals changed during the approximately 30 microseconds between clock signals. Any time that these threshold signals change, (indicating a change in the battery status), an interrupt can be generated. An interrupt is inhibited for approximately 150 microseconds when the DASIC 16 is first powered up to allow the threshold signals to be stable.

The analog register 84 also has a watchdog timer 110, which is a four-bit counter that is loadable by four bits which physically loads the preset to a counter 112. The watchdog timer 110 also receives a fifth bit as an input which acts as a control bit to enable the timer to wake up the lock 10 from the sleep mode. The purpose of the watchdog timer 110 is for waking up the lock 10 to fire the solenoid 32 again after the lock 10 has been asleep for a short period of time. For example, after opening the lock 10, it may be desired to re-lock the lock 10 after ten seconds. Once the lock 10 has been opened, it will go into the sleep mode and be awakened after 10 seconds to re-lock the lock 10, thereby conserving power. It is the fifth bit which determines whether the counter of the watchdog timer 110 is being operated.

Figure 8:
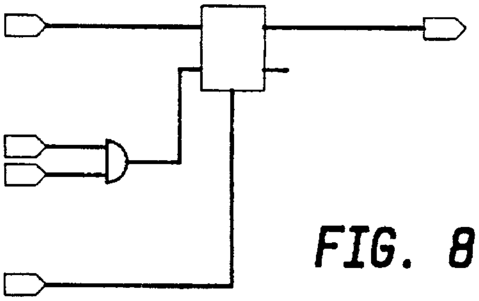
FIG. 8 is a logic diagram of a test register of the DASIC of FIG. 4.

A test register 86, seen in FIG. 4 and in more detail in FIG. 8, is a simple register for putting the DASIC 16 into a test mode.

Figure 9:
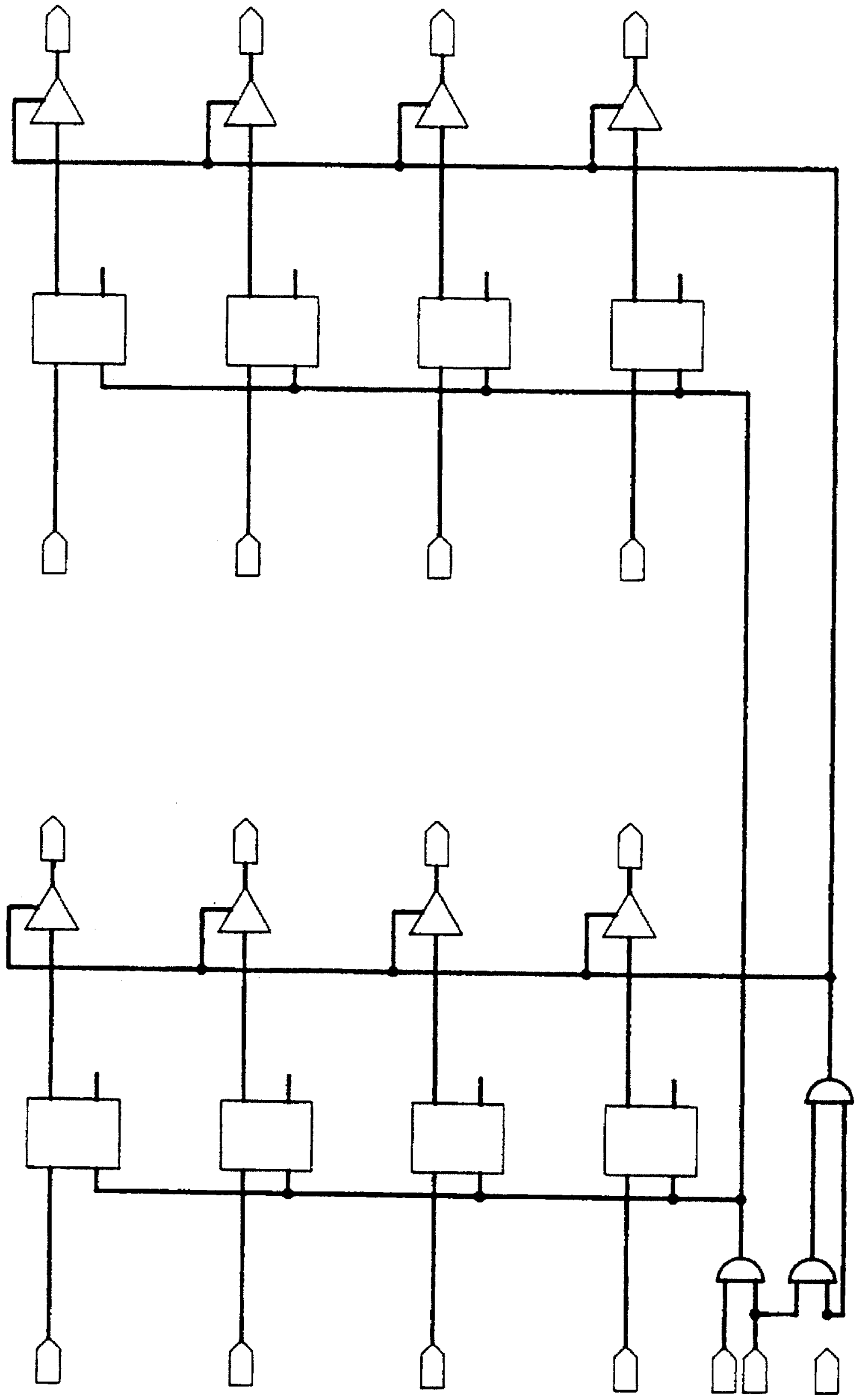
FIG. 9 is a logic diagram of a general purpose register of the DASIC of FIG. 4.

The general purpose register 88, seen in FIG. 4 and in more detail in FIG. 9, is a readable/writable register usable as a "scratch pad", and may communicate to the microprocessor 18.

Figure 10:
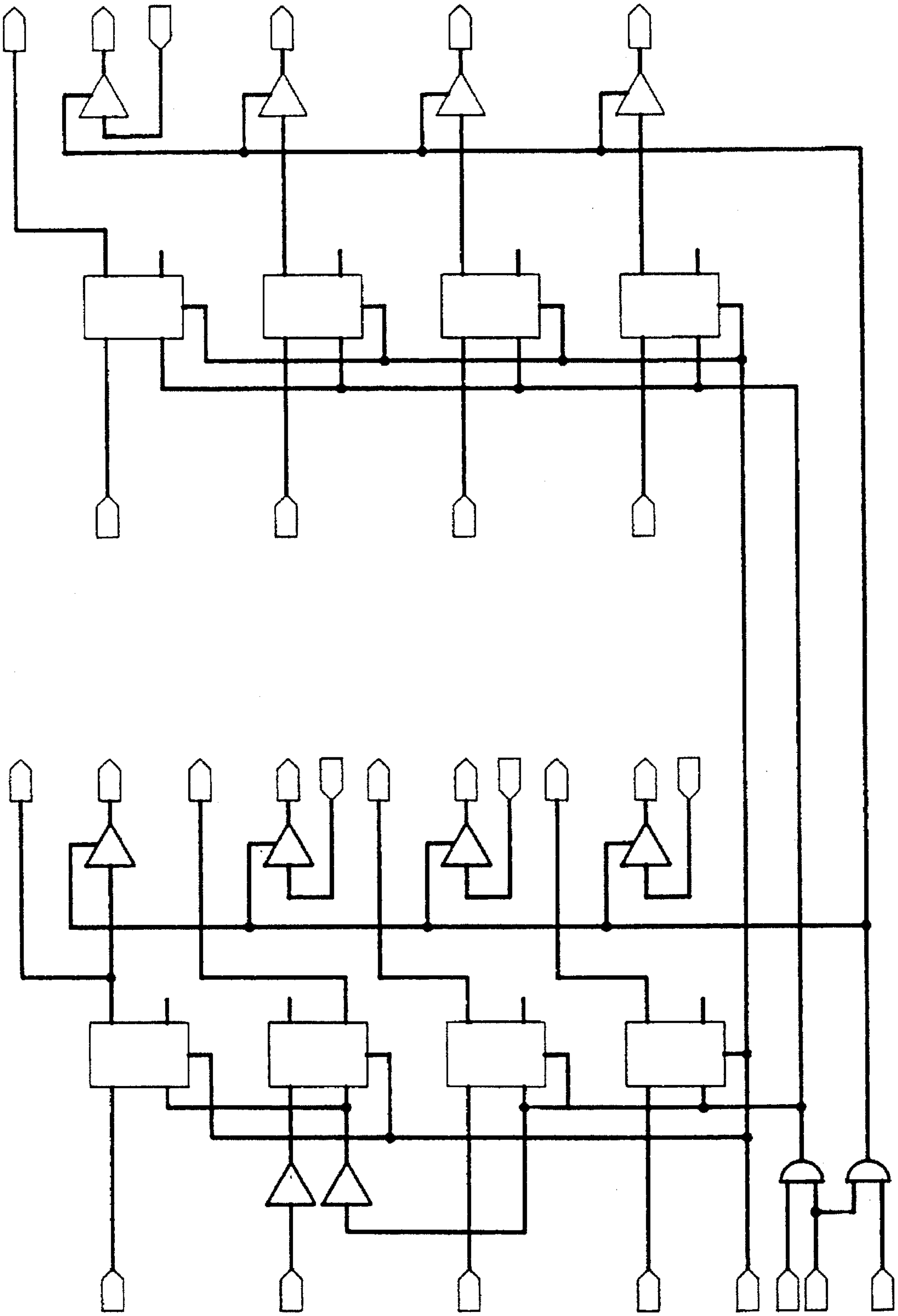
FIG. 10 is logic block diagram of communication ports of the DASIC of FIG. 4.
Figure 11:
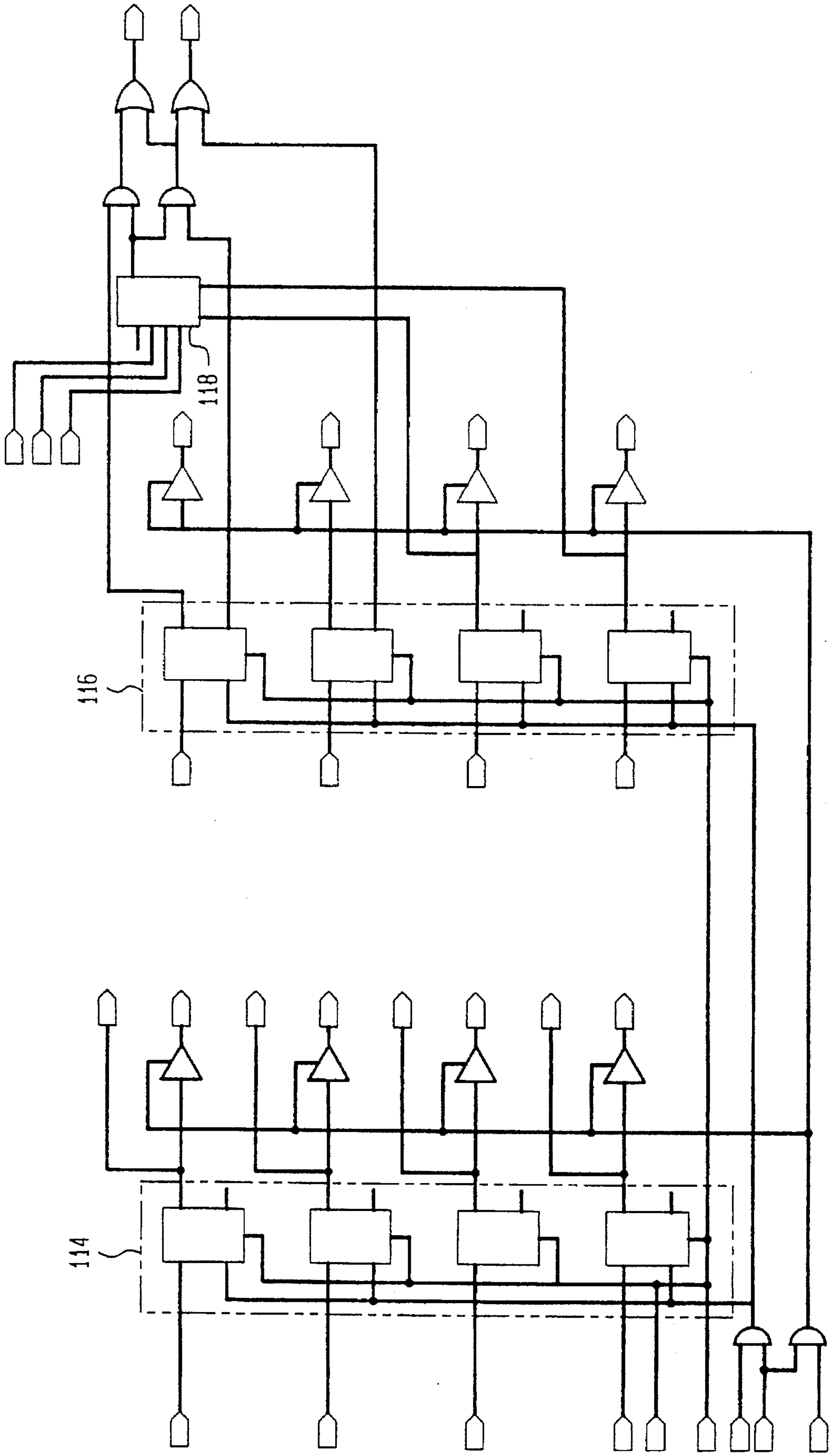
FIG. 11 is a logic diagram of solenoid/LED ports of the DASIC of FIG. 4.

Communications for the DASIC 16 are done through communications port registers 90, shown as a block in FIG. 4 and in more detail in FIG. 10. The data received and transmitted are fed through the registers shown in FIG. 10. There is a LED driver coming off a latch and the receive data input are routed to the bus 40 through a tri-state enable. This is done for the data inputs from the link communications ports 46 and from the connections to the NVRAM 34. The clock for the NVRAM 34 is passed straight through the communications port registers 90.

The solenoid 32 and the LEDs 28 are driven by the solenoid and LED control 92 which has a four-bit register 114 which generates control signals from data bits from the bus 40. The four-bit register 116 uses data bits from the bus 40 to determine whether the light will be green or red and whether the light will be on or off. Other data bits are fed to a multiplexer 118 which determines the flash rate for the LEDs 28.

Figure 12:
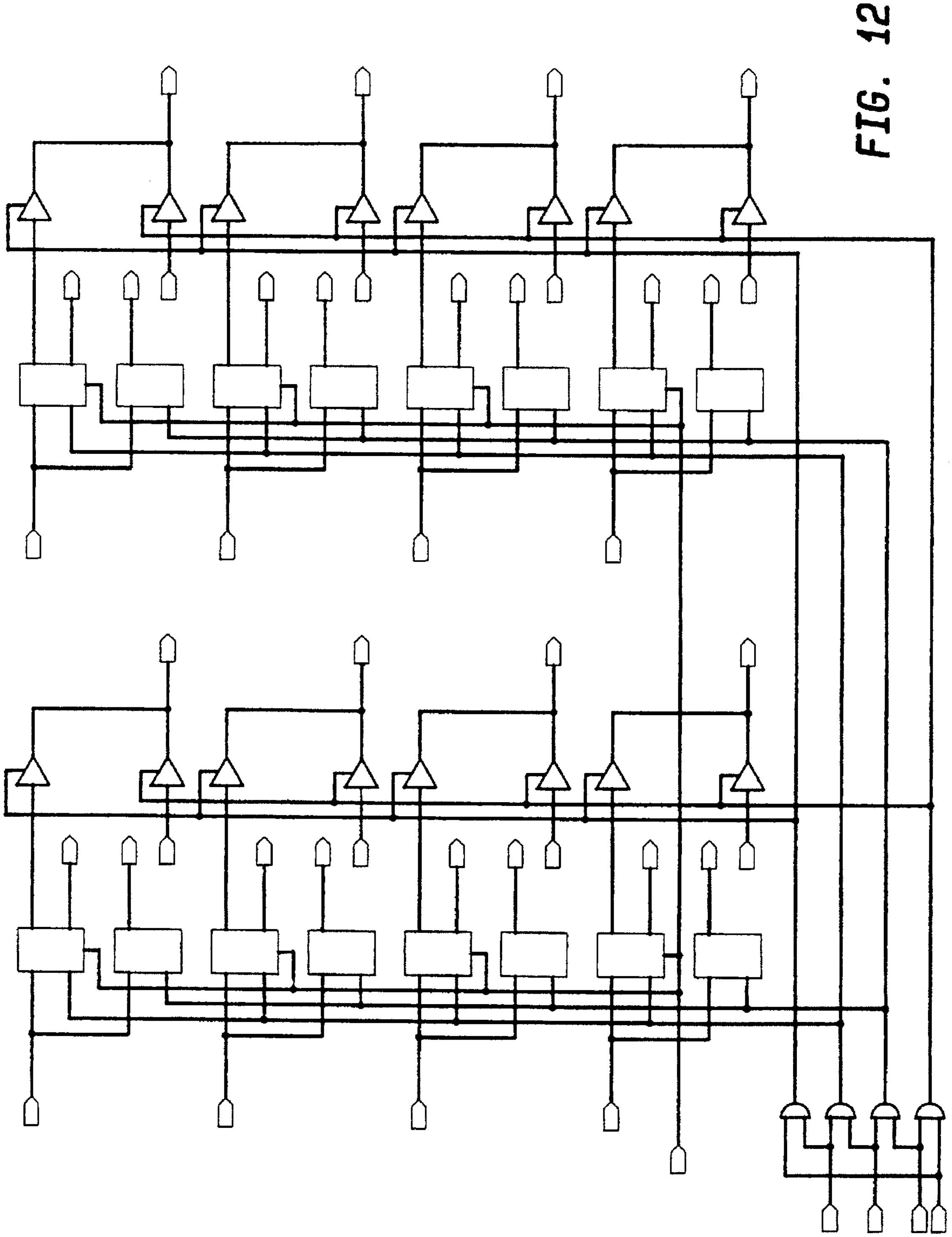
FIG. 12 is a logic diagram of the programmable I/O of the DASIC of FIG. 4.
Figure 13:
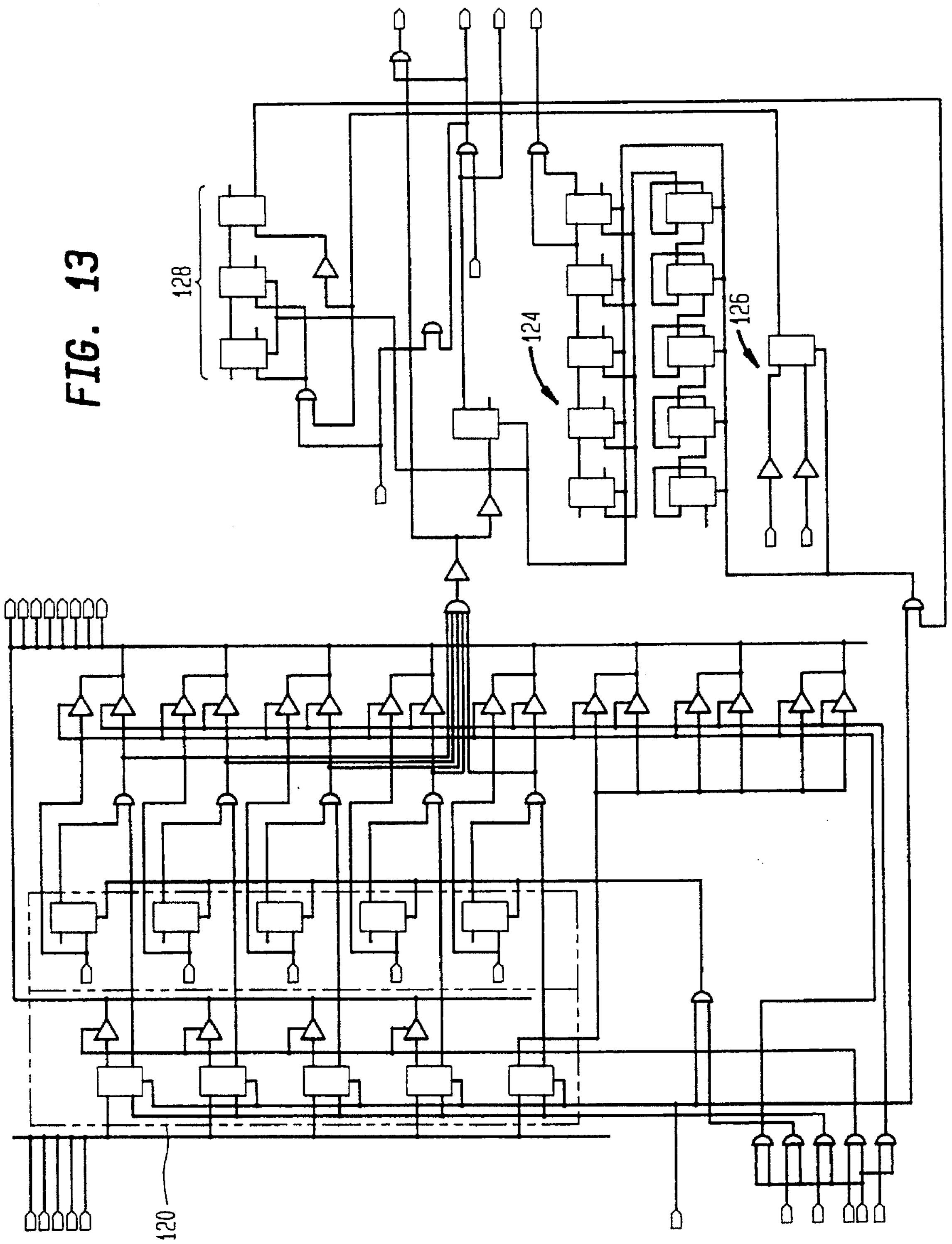
FIG. 13 is a logic diagram of the interrupt block of the DASIC of FIG. 4.

A programmable I/O 94 is shown in block diagram form in FIG. 4 and in more detail in FIG. 12. The programmable I/O 94 provides the programmable input and output pathway to optional extensions to the existing design, such as additional test ports and additional external control units. It is through this programmable I/O 94 that the lock 10 communicates with a central database by, for example, telephone. The lock 10 can thus be controlled and reprogrammed with information received from the central database, as well as send information to the database. The central database can therefore maintain accurate and up-to-date records of the identifications and accessibilities of the locks 10 that are tied to the central database.

In addition to the programmability through telephone lines, the lock 10 (and the key 12) can both be programmed (or reprogrammed) by means of portable remote programming devices. These can be hand-held devices that are portable to the site of the lock 10 or the key 12. The electronic reprogrammability of the lock 10 and the key 12 using a hand-held programmer allows a relatively unskilled person to simply reprogram a lock 10 or key 12 without extensive training as a locksmith. Reprogramming is, of course, subject to security constraints that are initially programmed into the lock 10 and key 12, as described later.

The interrupt block 96 creates the interrupt signals for the AASIC 14. There is a flip-flop block 120 containing flip-flops 122 that receive independent mask signals as inputs. These flip-flops 122 are edge-sensitive flip-flops. All of the registers are readable and are OR'ed together. An interrupt signal to one of these flip-flops 122 sets the flip-flop 122 which generates a START signal and a POWERUP signal. At the same time, cycling occurs with the clocking being divided by a divider 124 so that the output is shifted at a 1 kHz rate. A timing signal is developed at a 1 kHz rate where after the power is up, and there has been a power acknowledge, a START is generated. This allows the microprocessor 18 to start oscillating with the Z80 clock signal. The interrupt signal is sent out and a Z80 reset signal is generated. The AASIC 14 should now be fully powered up out of its sleeping mode. When the power is to be shut down, the microprocessor 18 generates a HALT signal, and a flip-flop 126 is set, to cause flip-flops 128 that physically generate a delay that causes a reset to occur which removes power from the microprocessor 18, the SRAM 22, the ROM 20 and the NVRAM 34.

Figure 14:
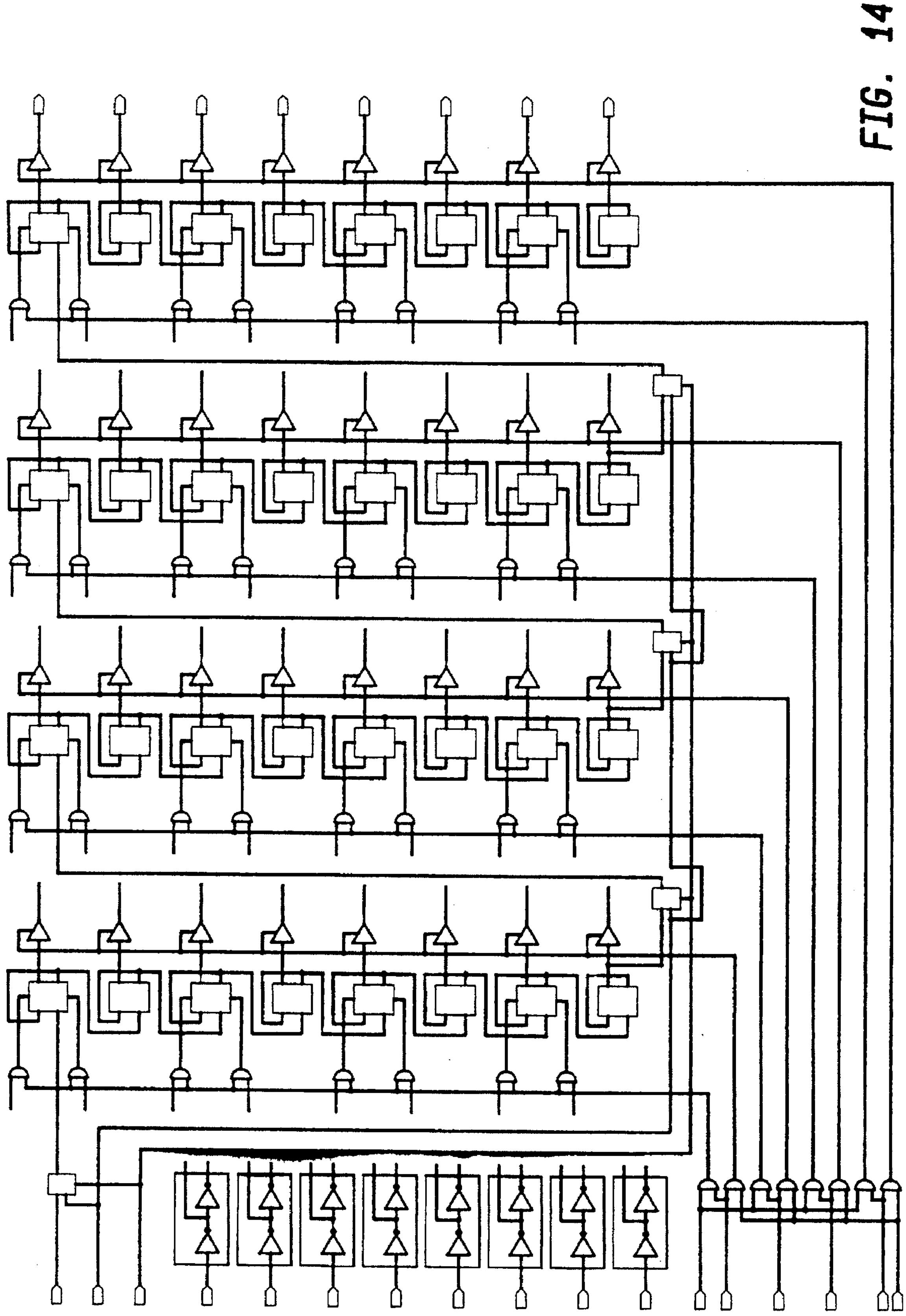
FIG. 14 is a logic diagram of the calendar block of the DASIC of FIG. 4.

The clock calendar 98, shown as a block in FIG. 4 and in more detail in FIG. 14, is a conventional thirty-two bit counter with a one Hz input.

Figure 15:
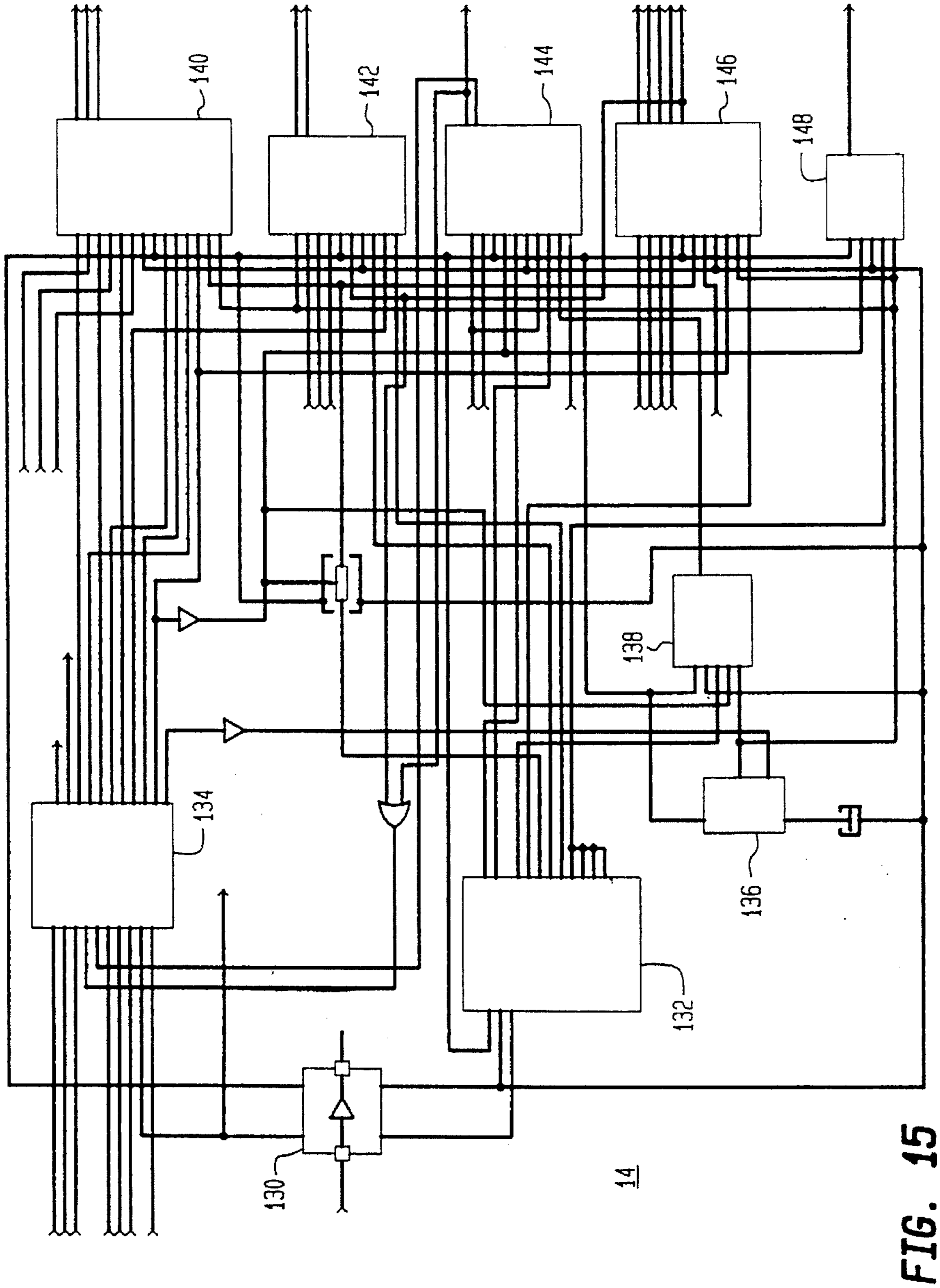
FIG. 15 is a block diagram of an analog ASIC (AASIC) of the lock of FIG. 1.

The following is a description of the AASIC 14, which is shown in block diagram form in FIG. 15. As seen in FIG. 15, the AASIC 14 comprises several functional blocks, which are an oscillator 130, a bias block 132, a digital block 134, a VRefIR block 136, a VRef block 138, a threshold block 140, an IR detect block 142, a window detect block 144, a TTL I/O block 146 and a VRegEx block 148. The AASIC 14 controls the power distribution of the electronics of the lock 10, and performs input sampling to detect external stimuli to the lock electronics. The AASIC 14 is designed to minimize current consumption of the system, and therefore extend the life of the battery 26. The minimization is accomplished by sampling inputs at a specific data rate, and only power up the analog comparators and op-amps of the system during the sampling period. This sampling has been already described.

Figure 19:
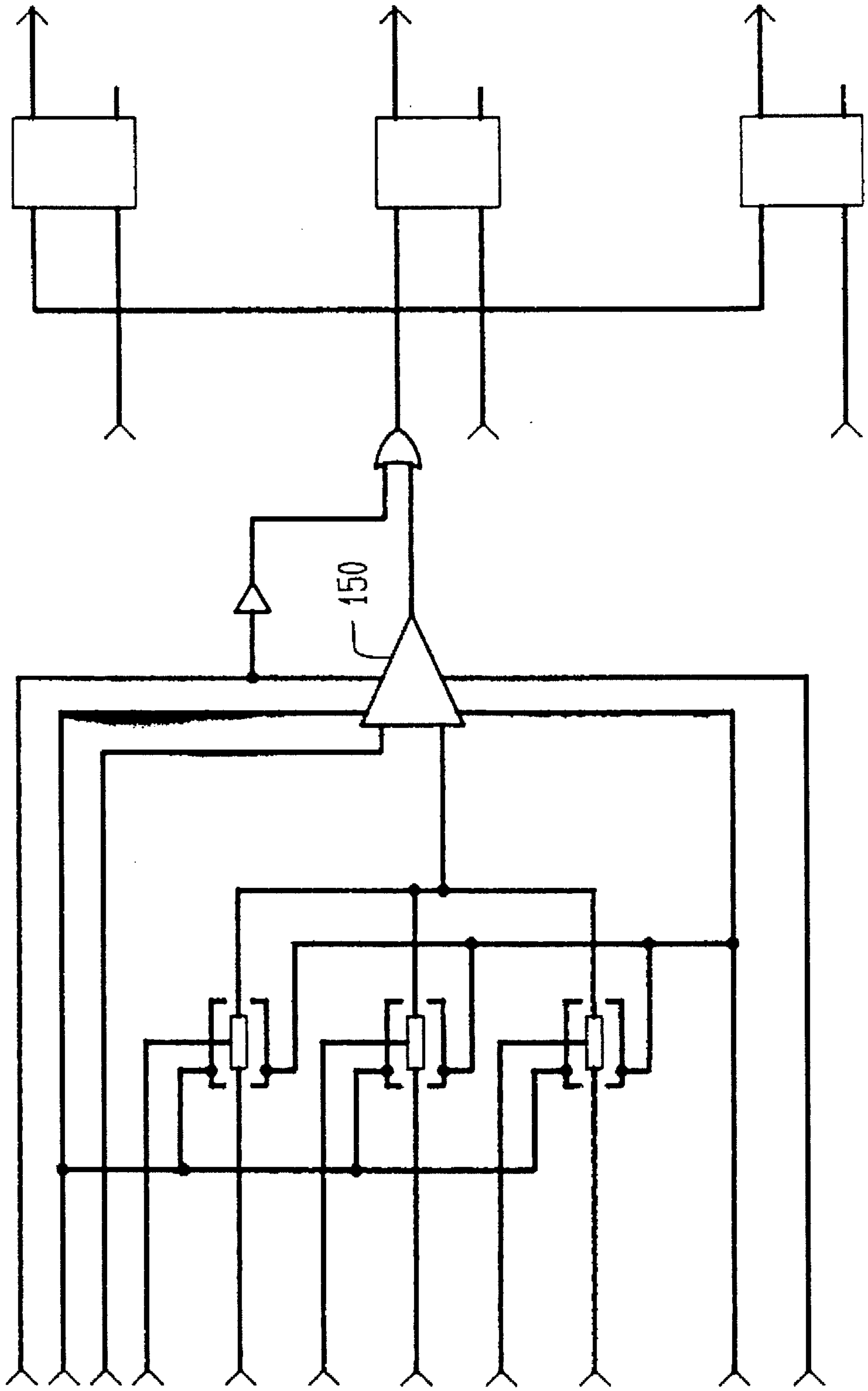
FIG. 19 is a schematic diagram of the threshold block of the AASIC of FIG. 15.

The threshold block 140, shown in block form in FIG. 15 and in more detail in FIG. 19, receives three inputs termed NETWORK1, NETWORK2, and NETWORK3. When NETWORK1 is above 1.18 Volts, THRESH-1, an output signal, will indicate high (active). If the voltage on NETWORK1 is under 1.18 V, the output of THRESH-1 will be low. If NETWORK2 is above 1.18 V, THRESH-2, an output signal, will indicate high (active). If the voltage on NETWORK2 is under 1.18 V, the output of THRESH-2 will be low. If NETWORK3 is above 1.18 V, the output of THRESH-3, an output signal, will indicate high (active). If the voltage on NETWORK3 is under 1.18 V, the output of THRESH-3 will be low. An exemplary value for the threshold limit is 1.2 v+/−0.20 volts.

The threshold block 140 is driven by the digital block 134 to provide sampling of three different inputs with a common comparator 150. This is done for reasons of power conservation. The actual signals on the sampling can be monitored using a TESTMON output of the digital block 134, and selecting which signal is to be displayed using MON0, MON1, and MON2 input lines of the digital block 134.

Figure 20:
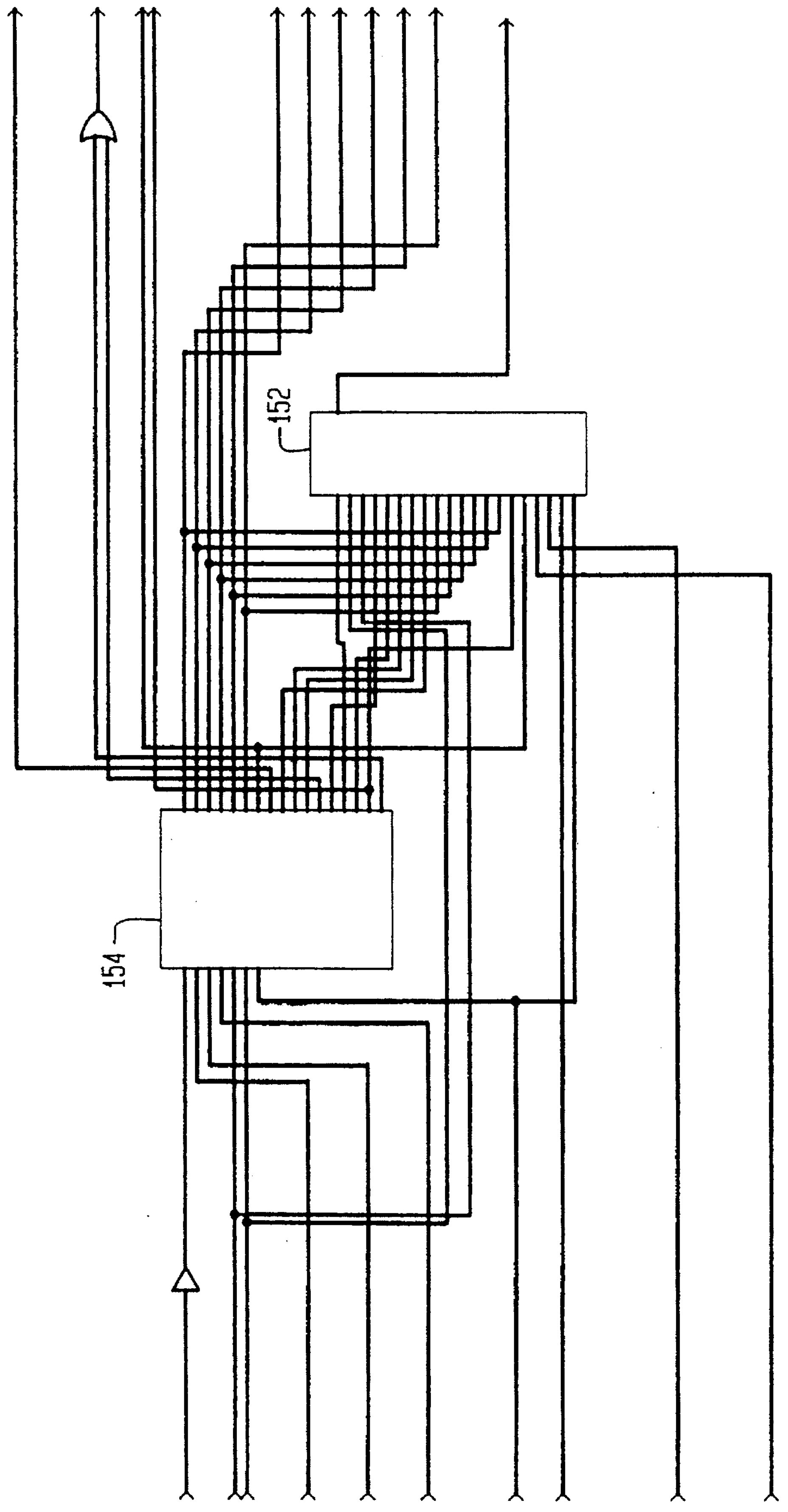
FIG. 20 is a block diagram of the digital block of the AASIC of FIG. 15.

The Digital Block:

The digital block 134 of the AASIC 14, shown in block form in FIG. 15 and in more detail in FIG. 20, controls the power up and power down sequence to the comparators and op amps of the AASIC 14. It minimizes the amount of time in which each of the individual comparators and op amps are sinking power. This power up/down sequence extends the battery life of the system. The digital block receives inputs from the 32 khz on-chip oscillator 130, and the inputs MONitor 0–2, Testin, Resetb, and Delay 0–1. The digital block 134 provides outputs of power up signals and clocking signals to the threshold block 140.

Figure 24:
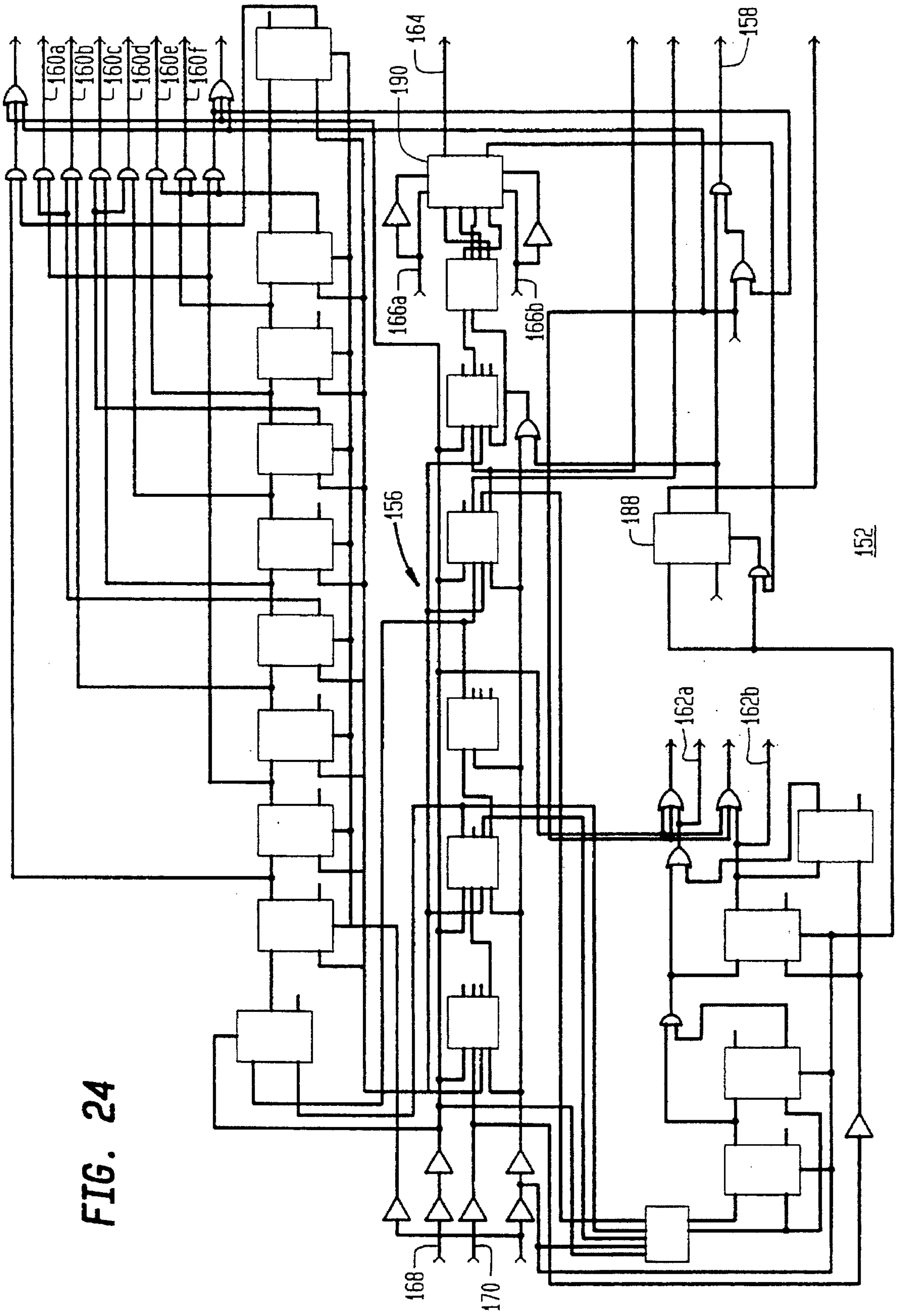
FIG. 24 is a logic diagram of the state machine of the digital block of FIG. 20.

The digital block 134 contains a multiplexer 152 and a shift register based state machine 154 to generate timing signals. These timing signals are used to switch the input and output of a comparator in the threshold block 140 from each of three input channels to three output channels. A high level on an external RESET line initializes the state machine 154 and starts all of the counters at a 0 state. A more detailed diagram of a state machine which can be used in the digital block 134 is illustrated in FIG. 24.

If a TEST input signal is high (1), the MONitor inputs may be used to select which of eight internal signals can be observed at the TESTMONitor output. The eight-to-one multiplexer 152 is used to switch one of eight test inputs to the output TESTMON, when the TEST is high. If the TEST input signal is low, the MON pins are used to switch several of the analog control signals to the output Monitor.

In the test mode, the AASIC 14 may be clocked with the MONitor inputs set at a particular value, until the respective output has changed. The MONitor inputs may then be incremented and the part clocked until the next event has been observed. This process may be repeated until all of the outputs have been observed to change from a 0 to a 1 and back to a zero. This process should take 16 clock cycles between the changing of the MON inputs. (Note each of the TEST inputs monitor 4 bits of a ripple counter. When test is enabled, the counters are clocked in sets of 4 bits each, with its most significant output routed to the TEST multiplexer 152.)

The following is a description of normal counter operation in the digital block 134. Under normal operation, the 32 khz clock signal is divided down by a divider chain 156 in the state machine 152 to provide a timing signal which is programmable to provide a variable timing signal to output 158. This output 158 has a programmable delay that is the amount of time in which the lock 10 is disabled after an overcurrent situation is detected.

Timing signals are provided to the threshold block 140 from the state machine 152 of the digital block 134 at outputs 160*a–f*. This shift register provides the timing pulses to generate the power up signals for the window detect block 144, the threshold block 140 and the voltage regulator, VRegEx 148.

When power is being pulsed into VRegEx 148, power is applied to the comparators in the window detect block 144, and the threshold block 140. Power is maintained until a single sample is taken of the voltage on the Network 1, 2, and 3 inputs of the thresh block 140, and these samples are clocked into the flip-flops to update the outputs THRESH1, 2, and 3. The clocking rate at which the samples are taken at a rate of once every 30.5 msec (32 samples per second) when the clocking frequency is 32,768 Hz. This translates to one sample every 1024 clock cycles. In the Test Mode of operation, the sampling rate is increased to once for every 32 clock cycles.

The digital block 134 also provides a separate timing function for power up, of the IR Detect block 142. This block is powered on for a 3.9 ms period every 250 ms (when clocked at 32 khz). The state machine 152 of the digital block 134 includes ripple counters to generate the long counts required to generate the timing signals, and its output may be observed in the TEST mode, when the outputs 162*a* and 162*b* are observed.

The signal on output 164 is used to determine the functionality of delay select inputs 166*a–b*. During the TEST mode, the delay select inputs 166*a–b* may be set to one of four possible combinations of inputs, and the signal on output 164 will be of varying frequency dependent on the programming.

The testing of the components of the AASIC 14 is accomplished through the use of a TEST input 168. This input 168 being active will turn on power to all of the op amps and comparators such that they may be tested without concern for cycling the state machine 152 into an "ON" condition. The only time clocking is required is to check the threshold block 140. The remaining components of the AASIC 14 may be tested without clocking a 32 khz input 170 of the state machine 152.

Figure 18:
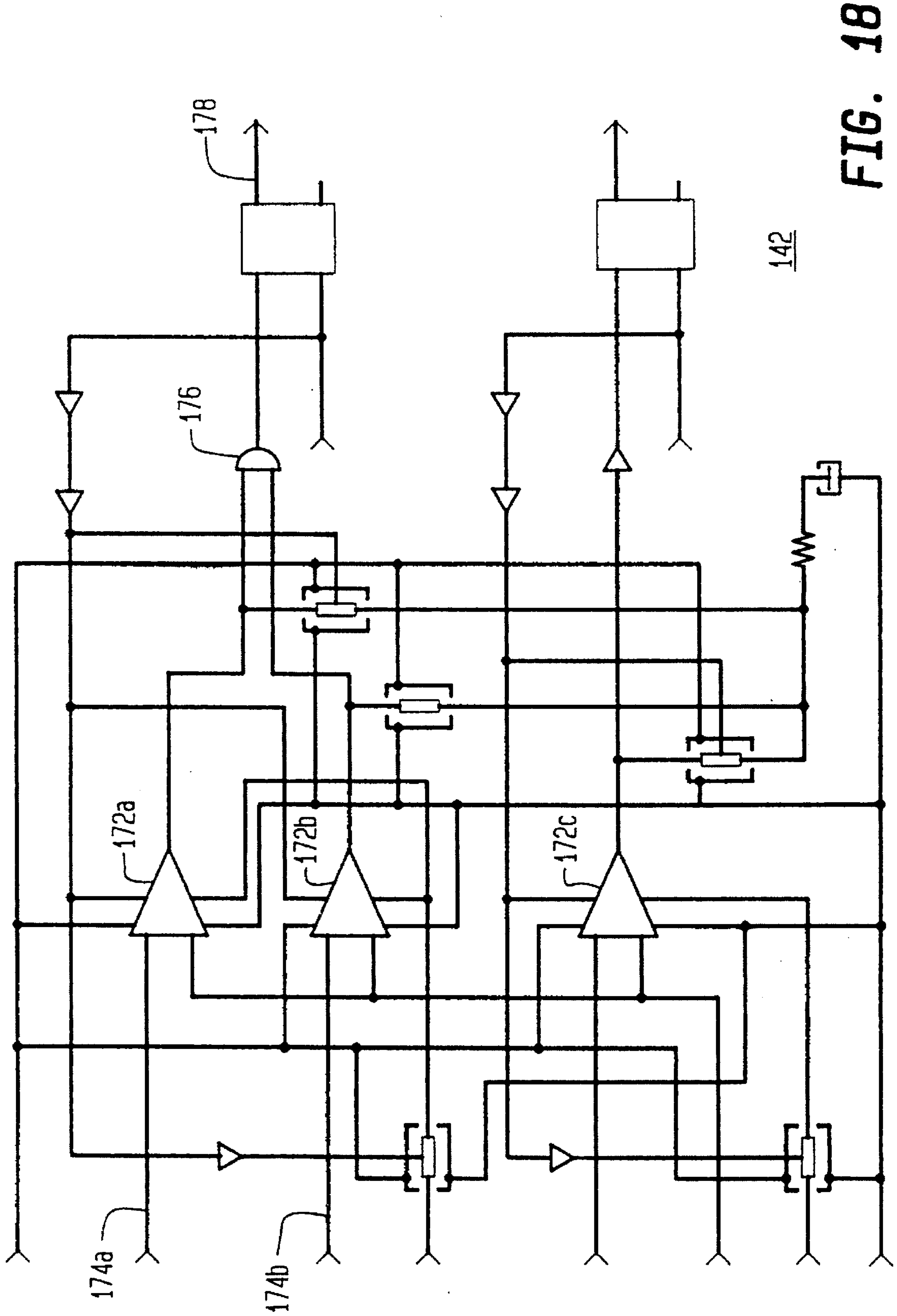
FIG. 18 is a schematic diagram of an IR detect block of the AASIC of FIG. 15.

The IR Detect block 142 is shown as a block in FIG. 15 and in more detail in FIG. 18. The IR Detect block 142 comprises three switched comparators 172*a–c*, whose power is pulsed on and off by signals generated in the digital block 134. If the PLACE signal (indicating a key 12 is inserted in the keyway 24) is generated by the window detect block 144, the power is applied in a steady state, and the pulsing is inhibited. The IR Detect block 142 has three inputs and two outputs. The inputs IRDETIN and IRDETOUT (174*a*, 174*b*) are fed to respective comparators 172*a*, 172*b* as non-inverting inputs. The outputs of the comparators 172*a–b* are provided to the inputs of a two-input NAND gate 176, to generate a key communication signal IRR1 at output 178. The comparators 172*a–c* have very high input impedance. The inverting input of the comparators 172*a–c* is fed by a switched voltage reference of 1.18 volts. Any voltage above 1.18 on IRDETIN or IRDETOUT will cause the output of the respective comparator 172*a* or 172*b* to go from logic low to logic high. Since these feed the two-input NAND gate 178, the following table reflects the logical operation of IRR1

| IRDETIN | IRDETOUT | IRR1 |
|---|---|---|
| 0 | 0 | 1 |
| 0 | 1 | 1 |
| 1 | 0 | 1 |
| 1 | 1 | 0 |

Logic 0 = below 1.18 Volts
Logic 1 = above 1.18 Volts

From this truth table, it is clear that when using only the IRDETOUT input 174*a* as a source for the key signal, the IRDETIN input 174*b* must be tied to the battery voltage for the system to operate.

The IR Detect block 142 may be checked in the TEST mode without clocking the block 142. DC voltages may be ramped up or down on the IRDETIN and IRDETOUT inputs 174*a*, 174*b*. When either of the comparators 172*a* or 172*b* switch, the output IRR1 changes (if IRDETOUT changes from 0 to 2 v, IRR1 will switch from VCC to 0, if IRDETIN is held above 2 v, and if IRDETIN changes from 0 to 2 v, IRR1 will switch from VCC to 0, if IRDETOUT is held above 2 v). Note, that if either IRDETIN or IRDETOUT are held below 2 volts, IRR1 will always remain at VCC.

Figure 17:
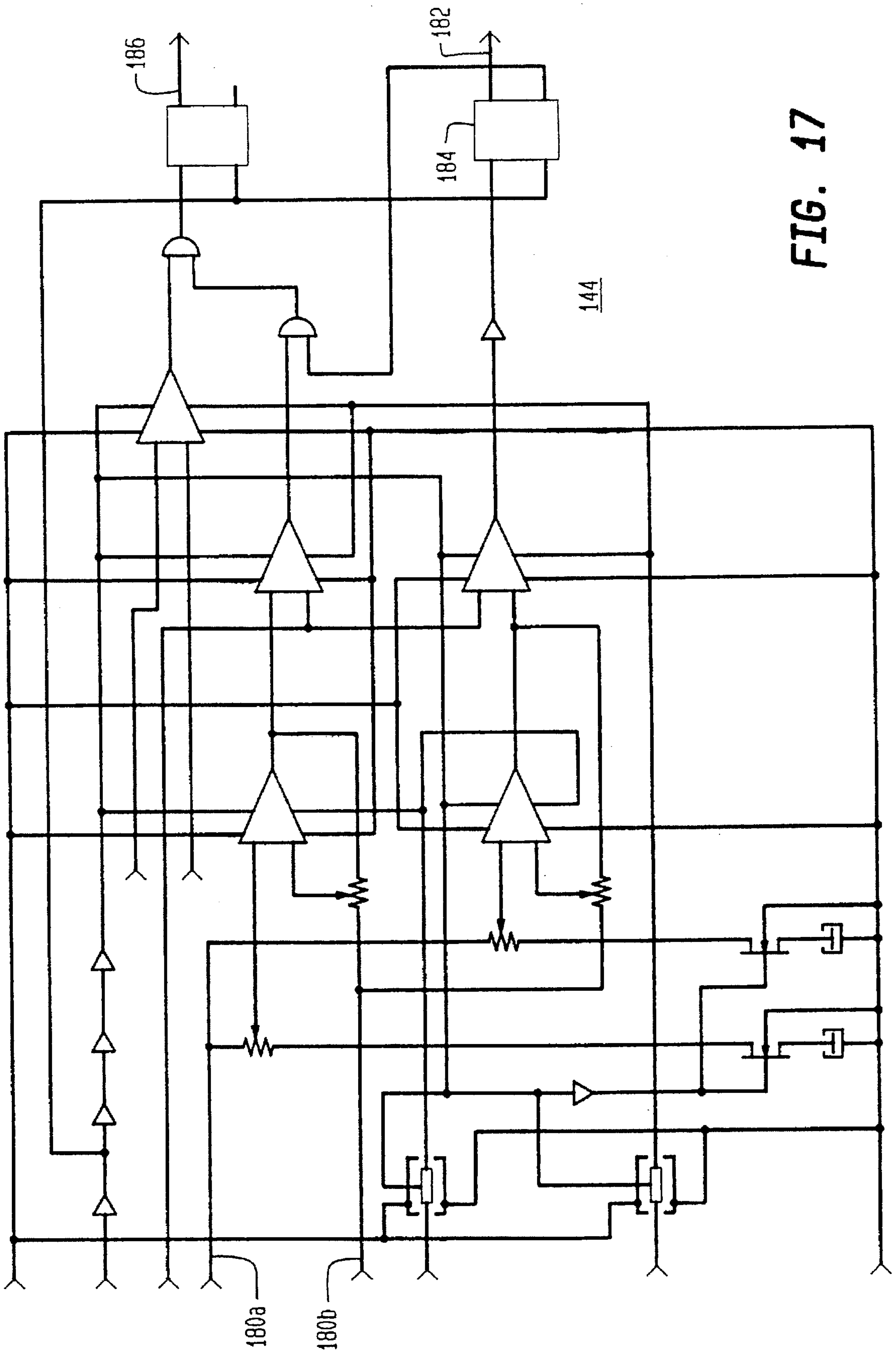
FIG. 17 is a schematic diagram of a window detect block of the AASIC of FIG. 15.

The window detect block 144 is shown in more detail in FIG. 17. The general functionality of the window detect block 144 is to determine whether current is present between current in and current out inputs of the AASIC 14. These are the CURRIN and CURROUT inputs 180*a* and 180*b*.

In normal operation, an 18 ohm resistor (36 in FIG. 1) is present between the CURRIN and CURROUT inputs 180*a* and 180*b*. The voltage at CURRIN and CURROUT is approximately 5 v. (This is two diode drops below VREG). When a key 12 is placed into the lock 10, the electronics of the key 12 are powered up, and current begins to flow through the key VCC. This current flow forces a voltage differential between the CURRIN and CURROUT inputs 180*a* and 180*b* through the 18 ohm resistor. This voltage differential is detected by the op amps and comparators in the window detect block 144. The gains of the op amps are set such that one op amp and comparator trip at a lower current level than the remaining op amp and comparator.

During the time at which the current flow is between these two limits, the PLACE signal becomes active. This should occur when the current through the 18 ohm resistor is between 7.5 ma and 37.5 ma. Once the current is greater than 37.5 ma an OVER (overcurrent) signal at output 182 becomes a logical 1, clocking an internal flip-flop 184. The outputs of this flip-flop 184 disable base current drive to the external transistor which supplies current to the key 12, as well as removing the signal PLACE provided at output 186. It also initiates another internal state machine which sets a programmed delay, until the key current becomes enabled again. While this overcurrent condition is present, the PLACE output 186 becomes a logical 0. The limits for the PLACE and OVER current are:

NO PLACE detect when I<5 ma

PLACE when I>8 ma and I<32 ma

OVER when I>33 ma

If OVERcurrent is detected by the window detect block 144, an internal flip-flop 188 within the digital block 134 latches in a high, which inhibits drive to the output 158 of the digital block 134, effectively shutting down current to the key 12. This flip-flop also removes a reset to the divide by sixty-four counter chain 156, and this counter chain 156 begins counting at a 1 Hz rate. The upper four bits of this counter chain 156 are fed through a four to one multiplexer 190. The select lines for this multiplexer 190 are the delay select inputs 166*a–b*. These inputs are direct CMOS inputs, and are not level shifted by the TTL I/O block 146. The delay to apply key drive is set by programming the delay select inputs 166*a–b*. The amount of delay provided is shown as follows:

| Input 166a | Input 166b | DELAY |
|---|---|---|
| 0 | 0 | 3.5 Seconds |
| 0 | 1 | 7.5 Seconds |
| 1 | 0 | 15.5 Seconds |
| 1 | 1 | 31.5 Seconds |

Since this counter chain 156 started with all zero's in its contents, the first time the output of the multiplexer 190 goes from zero to one, the output will feed back to the OVER-current flip-flop 188 and reset this flip-flop 188. The reset condition will inhibit and reset the counter chain 156, and will enable the output 158 drive again.

Figure 23:
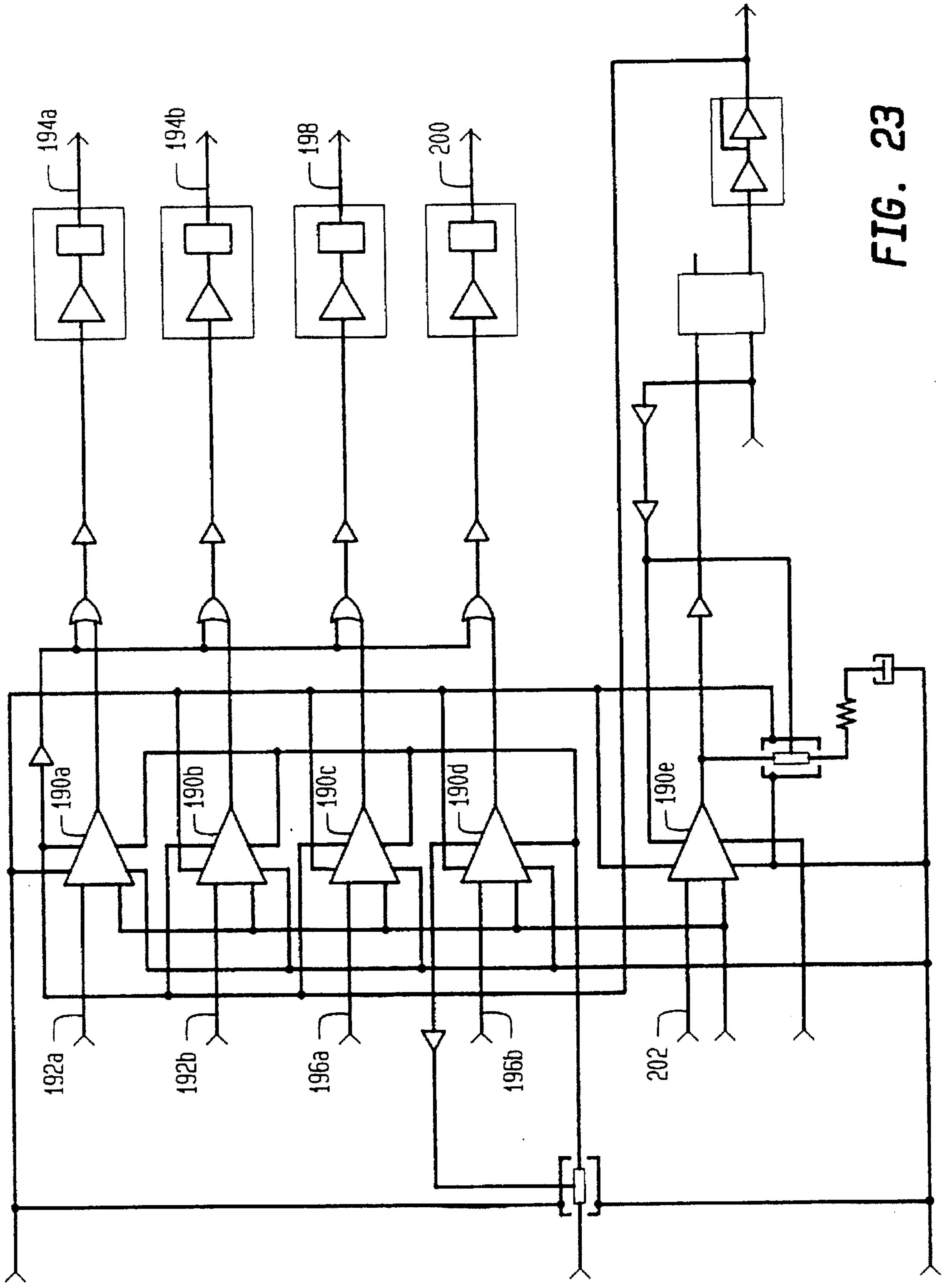
FIG. 23 is a schematic diagram of the TTLI/O block of the AASIC of FIG. 15.

The TTL I/O block 146 is shown as a block in FIG. 15 and in more detail in FIG. 23. The TTL I/O block 146 has a number of comparators 190*a–e* designed to switch at 1.2 volts. The input stimulus is from a CMOS digital device whose outputs may be switching through TTL levels. Thus, the inputs may be treated as digital signals and switched from 0.4 v to 2.2 v.

The input signals RED and GREEN provided respectively at inputs 192*a* and 192*b* are non inverting, and a level of 0.4 v and below should produce a logical 0 on REDLED and GRNLED outputs 194*a*, 194*b*. This low is detected as current flow when the outputs 194*a–b* are forced at a voltage other than VCC. This current should not be present, and the outputs should be tristated when the inputs are above 2.2 v.

The IRT1 and IRT2 inputs 196*a* and 196*b* are inverting, and similar to the RED, and GREEN output drivers. A voltage greater than 2.2 v on IRT1 (196*a*) or IRT2 (196*b*) produce current flow when the outputs IRLED (198) and LINKLED (200) are held at a voltage lower than VCC. This current should not be present, and the outputs should be tristated when the inputs are less than 0.4 v.

A POWERUP input 202 controls the SVCCON output. The output is non-inverting, and as such should be a 0 when POWERUP is less than 0.4 v and at VCC when POWERUP is greater than 2.4 v. This output is a standard CMOS output and drives in both the low and high states.

Figure 22:
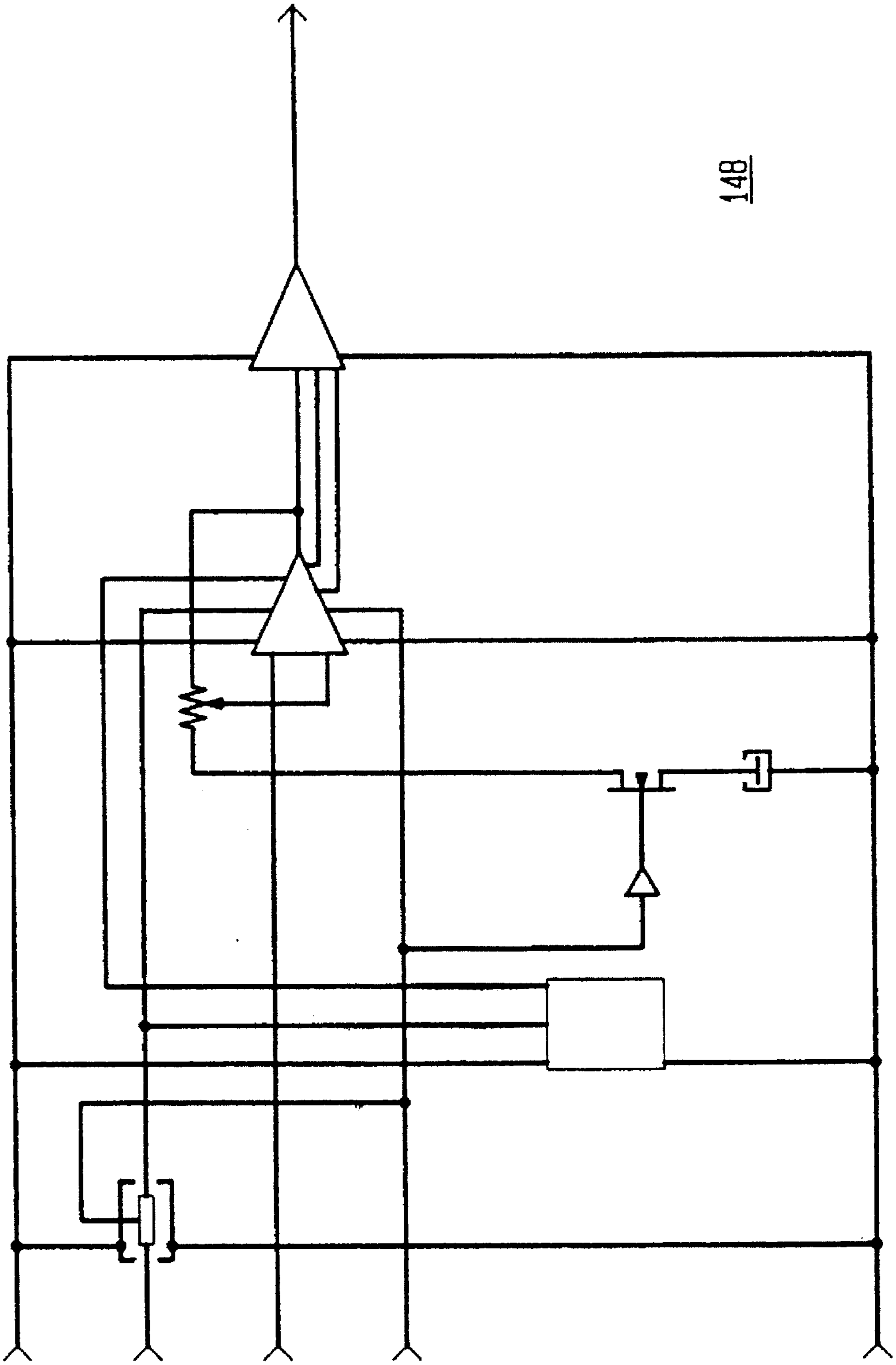
FIG. 22 is a schematic diagram of the VRegEx block of the AASIC of FIG. 15.

The voltage regulator VRegEx 148 is shown as a block in FIG. 15 and in more detail in FIG. 22. Under normal operation, VRegEx 148 is switched from a driving to a high impedance state on a cyclical basis in order to improve the efficiency of the energy conversion of the voltage regulation. The VRegEx 148 operates to charge a capacitor which maintains voltage on a transistor which in turn supplies VCC to the lock 10 during low current operation. When a PLACE, or other external stimulus is detected, VRegEx 148 is turned on continually for high current operations (i.e. switching solenoids, or transmitting via the LINK LED). The oscillator 130, shown in FIG. 15, is a low power oscillator that operates with a 32768 Hz crystal, and provides sufficient feedback to start the oscillator 130 within 300 ms of power being applied to the AASIC 14. This oscillator 130 is implemented on the AASIC 14 and is subsequently fed into the DASIC 16.

Figure 16:
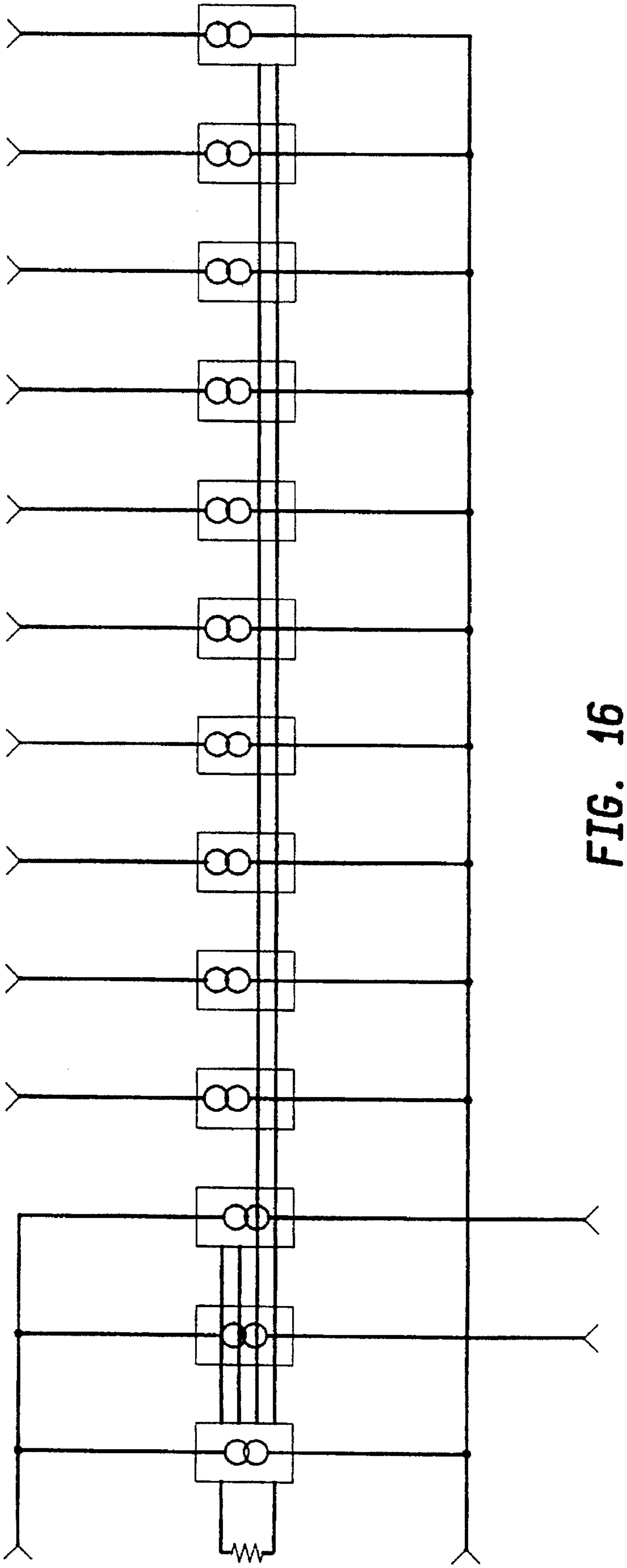
FIG. 16 is a block diagram of a bias block-of the AASIC of FIG. 15.
Figure 21:
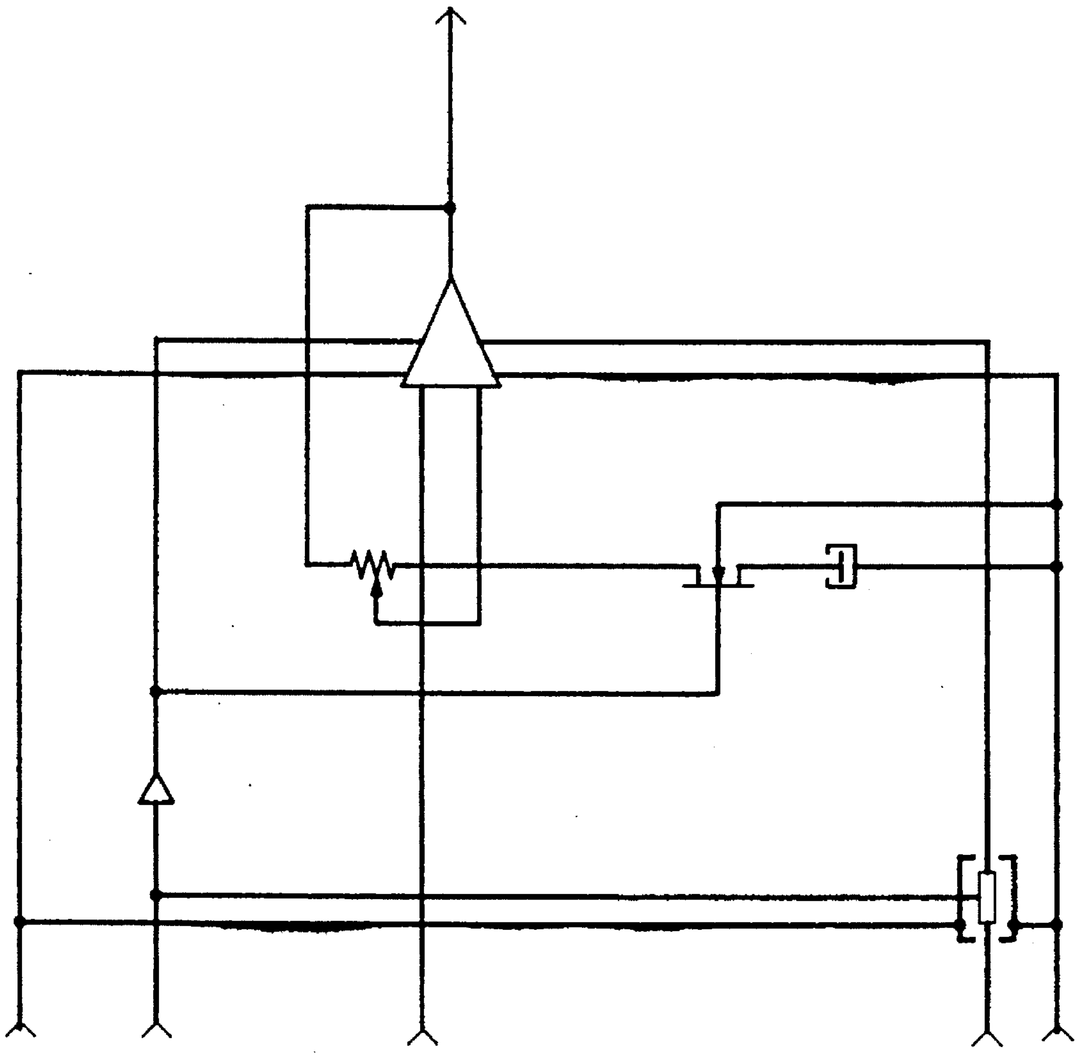
FIG. 21 is a schematic diagram of the VRef block of the AASIC of FIG. 15.

The bias block 132 is shown in greater detail in FIG. 16 and the VRef block is shown in greater detail in FIG. 21.

Figure 37:
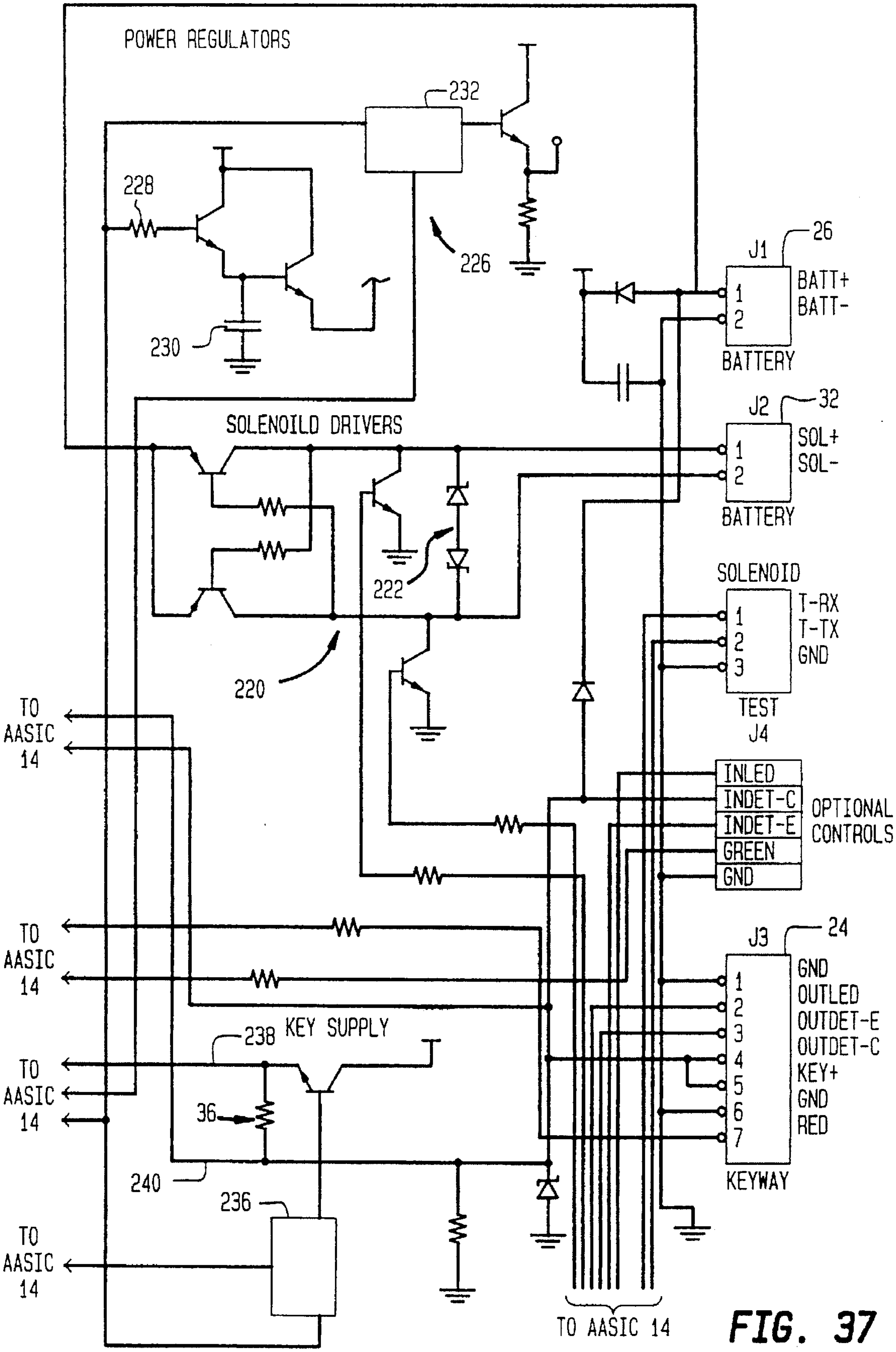
FIG. 37 is a schematic diagram of the electronic components of the lock of FIG. 1.

FIG. 37 is a schematic diagram showing the discrete parts 30 of FIG. 1 in more detail. A solenoid driver section 220 is coupled to the DASIC 16 to receive control signals from the DASIC 16 that control the solenoid 32. One of the control signals is received at the base of transistor $Q_5$, while the other control signal is received at the base of transistor $Q_4$. The collector of transistor $Q_5$ is coupled to the base of transistor $Q_2$, while the collector of transistor $Q_4$ is coupled to the base of transistor $Q_3$. A pair of Zener diodes 222 limits the voltage across the solenoid lines 224, 226 to less than approximately 10.3 volts. The transistors $Q_2$ and $Q_3$ are coupled to the battery 26.

In operation, a high signal present at the base of transistor $Q_4$ will cause the voltage at the collector of transistor $Q_4$ to go low and the base of transistor $Q_3$ will also be low. The voltage from the battery 26 is carried on line 226 to the solenoid 32 to drive the solenoid 32 into lock position.

In similar fashion, an unlock signal from the DASIC 16 that is provided to the base of transistor $Q_5$ causes the voltage at the collector of transistor $Q_5$ to be low, and the base of transistor $Q_2$ to be low. This allows the voltage on line 224 to go high, while the voltage on line 226 is held low. This drives the solenoid 32 into the unlock position.

The discrete parts 30 also include a power regulator 226 which regulates the power from the battery 26 to one of two voltage levels, $V_{Reg}$ and $V_{Sw}$. The voltage $V_{Reg}$ is provided via a circuit having a current limiting resistor 228 coupled to receive a $V_{Reg}$ signal from the AASIC 14. The other end of this current limiting resistor 228 is coupled to the base of a transistor $Q_7$, whose collector is coupled to the battery 26. The emitter of transistor $Q_7$ is coupled to the base of transistor $Q_8$, the collectors of transistors $Q_7$ and $Q_8$ being coupled together. The base of transistor $Q_8$ is also coupled to a capacitor 230, the other end of the capacitor 230 being coupled to ground. The voltage $V_{Reg}$ is provided at the emitter of transistor $Q_8$.

The $V_{Sw}$ voltage is provided by a transmission gate 232 that receives as an input the $V_{Reg}$ signal and a "turn on" signal. A transistor $Q_1$, has its collector coupled to the battery 26, its base coupled to the output of the transmission gate 232, and its emitter coupled to a resistor 234. In response to the turn on signal from the AASIC 14, and the $V_{Reg}$ signal, the transmission gate 232 provides an output to the base of the transistor $Q_1$ to control the voltage $V_{Sw}$ that is provided at the emitter of transistor $Q_1$.

A second transmission gate 236 is used to control the supply of current to the key 12 from the lock 10. This transmission gate 236 is coupled to the base of a transistor $Q_9$, the collector of which is coupled to the battery 26. The current sense 36 is formed by a resistor coupled between a current inline 238 and a current outline 240, both of these lines being coupled to the AASIC 14. The control of the transmission gate 236 is provided by a signal from the AASIC 14.

Although not explicitly shown in the drawings, signals, such as the PLACE signal, can be smoothed if necessary by the use of a filter, such as an RC filter provided between the AASIC 14 and the microprocessor 18. The use of filters to smooth signals is well known.

The code mapping for the NVRAM 34 of the lock 10 and the NVRAM 59 for key 12 will now be described. This description is for illustrative purposes only, as other code mappings may be made without departing from the scope of the invention. For purposes of description, the following assumptions and terms are defined below.

Figure 25:
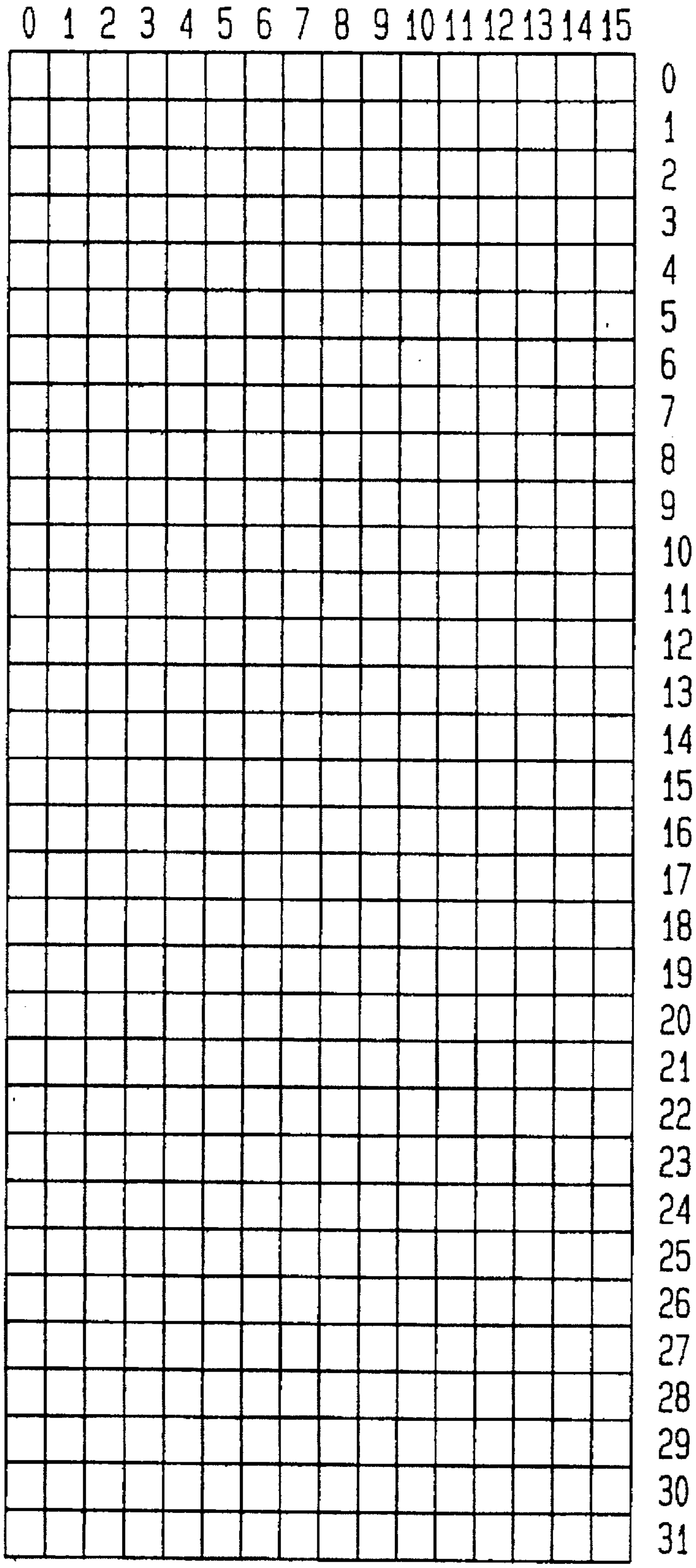
FIG. 25 is a representation of a blank page of a NVRAM used in either the lock of FIG. 1 or the key of FIG. 3.

It is assumed that the NVRAM 34 for the lock 10 has a full capacity of at least 4096 bits (4 Kb); the capacity of the NVRAM 59 for the key 12 is assumed to be at least 2048 bits (2 Kb). The term "page" is defined as a contiguous 512-bit area of the total NVRAM memory space. Thus, a 2048-bit NVRAM comprises four contiguous 512-bit pages, numbered from 0 through 3 (P0 . . . P3). A typical map of a blank NVRAM page is shown in FIG. 25.

The format of the data contained in the NVRAMs 34 and 59 of the lock 10 and the key 12 are illustrated in FIGS. 26–37, and is described below. The values stored in these NVRAMS 34,59 determine the operating characteristics of the lock systems and are programmed by the lock 10 and the key 12 either as a result of commands from a programming unit, commands from the lock 10, or as a result of conditions encountered during normal operation.

Words 1–4 of each INTELLIKEY lock NVRAM comprise a set of bit-encoded feature fields which enable or disable various capabilities in the lock 10. Each of these feature fields will be described below.

The Memory Size field (MSZ2:MSZ0) indicates the total amount of memory of the lock NVRAM 34, in Kbytes. A value of 0 indicates 16 Kbytes.

The Enable Timed Access Flag (ETIM) is a flag, when set, which indicates that the Timed Access feature is enabled in the lock 10. If the lock 10 has the minimum NVRAM size installed, all Timed Access checks use the table in NVRAM page 0 (Words 7–20). If the lock 10 has additional memory, Timed access checks for access codes 2–8 use the tables pointed to by the Extended Timed Access Pointer (described later).

The Enable Lock Expiration Date Flag (EEXP) is a flag that, if set to 1, allows disabling of a lock 10 upon the first insertion of a key 12 after a lock expiration date that has been coded in an Expiration Date field (discussed later). The lock 10 can be opened again only via the use of a special restricted access key (RAK).

The Enable Illegal Insertion Count Flag (EIIC) is a flag, if set to 1, that enables an Illegal Insertion Counter of the lock 10 and indicates that an Illegal Insertion Limit has been programmed.

The Lock/Relock Mode Field (LRM1:LRM0) is a flag bit field that indicates to the lock 10 in which relock mode it is to operate based on the combination of the lock and key function flags. The two bits of this field allow the lock 10 to operate in three different modes. Depending on the values of these bits the lock 10 can be set to: always operate in an automatic relock mode in which a Relock Time field indicates the delay; always operate in a toggle (passage) mode; or operate in a Shutout/Display mode. In the automatic relock mode, the lock 10 will automatically relock the door after a preprogrammed time delay. In the toggle mode, the lock 10 operates to activate the solenoid 32 to switch the current locking state of the lock, from locked to unlocked or from unlocked to locked. In the shutout/display mode, the lock 10 will not unlock the door, and will provide a display of status of the lock 10.

The Take Action on IIC Equal to IIL Field (ICA2:ICA0) is a three-bit field that indicates to the lock 10 what action is to be taken by the lock 10 when a count of illegal insertions is equal to a preprogrammed illegal insertion limit. This contents of this field are valid only if the EIIC flag described earlier is set. Depending on the values of the three bits in this field, the lock 10 will disable the key 12; disable the lock 10; disable both lock 10 and key 12; or initiate an alarm call using the LINK communication described earlier.

The IIC Count Function Field (ICT1:ICT0) is a flag bit field that indicates to the lock what is to be done to the Illegal Insertion Count upon a legal key insertion. The contents of this field are valid only if the EIIC flag is set. Depending on the values of these two bits, the lock 10 will either: take no action; decrement the illegal insertion count IIC; or clear the illegal insertion count IIC.

The History Wrap Mode (WRAP) is a flag that indicates how an access history list (described later) is to be updated. Depending on the value of this flag, the lock 10 either always overwrites the oldest record (running history), or it always overwrites the most recent record (retain oldest records).

The Access History Retention Flags (RLEG, RILL) are two flag bits whose values define the form in which key identification (key ID) retention is performed. These flag settings are independent of each other. Depending on the states of these flags, the lock 10: will not record legal insertions; will record legal insertions; will not record illegal insertions; and/or will record illegal insertions.

The first field in Word 2 is the Relock Time Field (RLT3:RLT0) that specifies the time, in seconds, that the lock 10 should wait between unlocking itself, and then relocking. This value is only valid if the Lock/Relock Mode Field indicates that the lock 10 should relock itself.

The Enable Auto Lock/Unlock Flag (EALU) is a flag, when set, that enables the automatic lock/unlock feature of the lock 10.

The Signalling Device Flags (LEDP and TONE) are flags that indicate to the lock 10 what type of signalling devices are installed. If the LEDP flag is set, it indicates that a visible LED is present. If the TONE flag is set, it indicates that an audible indicator is present.

The Link Present Flag (LINK) is a flag, when set, that indicates the presence of a second link channel.

The Link Detect Timing Field (LDT1:LDT0) is a field that indicates the number of identification cycles that must be received over a remote link before the lock 10 determines that a valid signal is being received. Depending on the values of the bits set in this field, the number of required cycles can be one, two, three or four.

The External Switches Present Flags (SW1P and SW2P) are two flags that indicate the presence of up to two external switch inputs. The meaning of the inputs are application dependent, but can typically be used for such things as solenoid position or deadbolt status.

THe Multiple PLACE Source (MLTP) is a flag, when set, that indicates that there may be more than one source for the PLACE signal, such as keyways 24 on both sides of the door. The lock 10 should interrogate other hardware to determine the specific source for the PLACE signal.

The Access History Time Resolution Field (TRS1:TRS0) is a field that indicates the accuracy with which the lock 10 should record the date and time for access history. The resolution selected determines the total number of records which may be stored. Depending on the values of the bits in this field, the lock 10 will not record time information; will record a 32-bit date and time; or will record the date only.

The Enable Deadbolt IR Link Flag (DBIR) is a flag, when set, which indicates that there is an IR link from the lock hardware to a receiver on a deadbolt which should be activated upon successfully locking or unlocking the lock 10.

The first field in Word 3 in the Enable Anti-Passback Flag (EAPB) that, when set, indicates that the lock 10 should monitor the Enable Anti-Passback Field (EAPB) and a Last Passback Direction Field (LPBD) of the key 12 to determine whether the Anti-Passback feature should be executed.

The Enable Access Time Lockout Field (EATL) is a flag, when set, which indicates that the inside keyway 24 on a door should be disabled when the time is outside of a legal operating window.

The Patch Code Present Flags (PC1P,PC2P,PC3P,PC4P) are flags which indicate that code is available in the NVRAM 34 for each of four patch code areas. The location and size of the patch code is read from the code area itself, as described later.

The Battery Low Indication Level Field (LBT1:LBT0) is a field that indicates at which voltage threshold the lock 10 should start signalling via the LEDs 28 that the battery voltage is low. Depending on the values of the bits set in this field, the lock 10 will: never signal; start signalling at the highest threshold level; start signalling at the second threshold level; or start signalling at the lowest threshold level.

Figure 26:
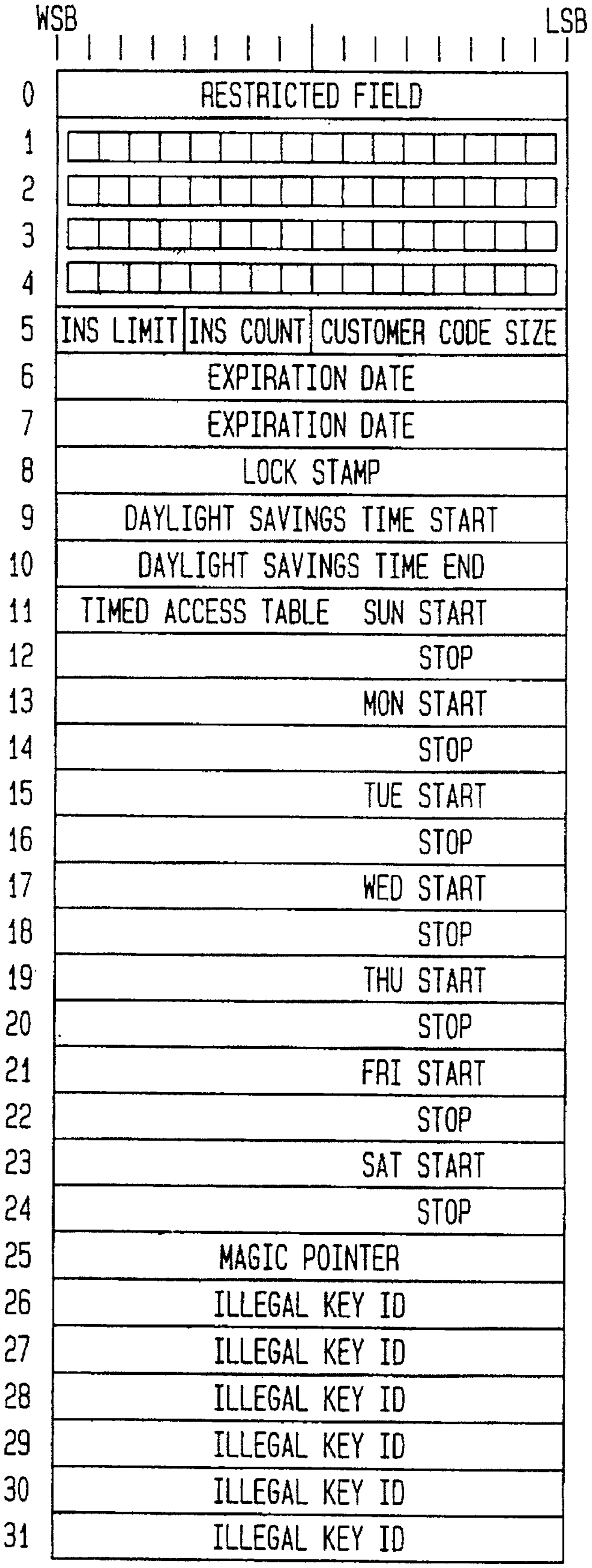
FIG. 26 is an embodiment of a code assignment map for a first page of memory of a NVRAM of the lock of FIG. 1.

Word 4, in the embodiment of the code map of FIG. 26, contains only a single field, the Feature Extension Size Field (FES3:FES0). This field contains the byte count of an optional feature extension field "FE" placed immediately below the lowest addressed byte of a Customer Data field. The "FE" field provides the capability of expanding the existing Feature field, should there be any need for an extension of lock functionality resulting from changes to the firmware of the microprocessor 18. If all the bits of the Feature Extension Size Field are set to 0, no feature field expansion is implemented.

Word 5 of the lock NVRAM 34 has three separate fields as follows. The first field is the Illegal Insertion Limit Field (IIL) that holds a preprogrammed limit of unauthorized key insertions that the lock 10 will accept before taking action. This limit is compared against the illegal insertion (IIC) count specified in the IIC field upon every illegal entry attempt. If the two match, the lock 10 takes the action specified by the ICA2:ICA0 feature bits described earlier.

The Illegal Insertion Count Field (IIC) holds the current number of illegal key insertions recorded by the lock 10. If the EIIC feature field is enabled, this number is incremented by the lock 10 upon every insertion of an unauthorized key. Upon a legal entry, the IIC counter may either be decremented, cleared to zero, or kept current. The type of action taken by the lock depends on the status of the ICT1:ICT0 feature bits described earlier.

The Customer Code Size field indicates the size, in bytes, of the Customer Data Field. Its value is two less than the number of bytes of data which must match between the lock 10 and key 12 to establish that both components belong to the same end customer. The extra two bytes are the Manufacturer ID field which is located immediately after the highest addressed byte of customer data. The Customer Data Field will be described later.

Words 6 and 7 of the lock NVRAM 34 are dedicated to the storage of a lock expiration date. If the expiration date is enabled through the EEXP feature field, after the programmed date the lock 10 will only accept interrogation and reprogramming via the use of a restricted authorization key (RAK).

Word 8 of the lock NVRAM 34 is a Lock Stamp Field that contains a value which identifies the lock 10 within the customer installation. This is the value which will be recorded in the key NVRAM 59 when the illegal access limit has been exceeded.

Words 9–10 of the lock NVRAM 34 are the Daylight Savings Time Adjustment words, which are two words that hold the dates and times for which the lock will automatically adjust its clock by one hour to account for the beginning and ending of Daylight Savings Time.

Words 11–24 of the lock NVRAM 34 is a Timed Access Table, which are words containing the table used by the lock 10 for all Timed Accesses. The ETIM feature bit described earlier must be set to enable this feature.

Word 25 of the lock NVRAM 34 is a Programming Pointer that is used during lock programming or reprogramming. This pointer is the address of the lock NVRAM 34 location up to which (inclusive) the lock microprocessor 18 is allowed to reprogram the contents of the lock NVRAM 34. The condition for reprogramming is that the value of the programming pointer of the reprogramming key, the restricted authorization key (RAK), or programmer at least match (or exceed) that of the lock 10. Otherwise, the request to reprogram is denied.

Consequently, in the initial process of programming locks 10 and keys 12 that have never been programmed, the value of this programming pointer is continuously decremented. This preserves the hierarchy of the distribution system and ensures unique identities of the distributed keys 12 and locks 10. In the process of reprogramming, the programming device establishes the new value of the programming pointer for the lock 10 which, however, can never exceed that of the programming device.

Whether programming or reprogramming the identities of a key 12 or lock 10, either remotely or at the manufacturing site, the present invention provides that the identity assigned to the key 12 or lock 10 that is embedded electronically is automatically recorded in a database. This automatic recordation of identity upon assignment ensures that some database independent of the lock 10 and key 12 has a record of the identities assigned to the keys 12 and locks 10 that exist.

Words 26–31 of the lock NVRAM 34 are a Illegal Key ID. These words are used for storage of the key ID, date, and time information when the Illegal Insertion Count (IIC) of a key 12 exceeds the programmed Illegal Insertion Limit (IIL).

Figure 27:
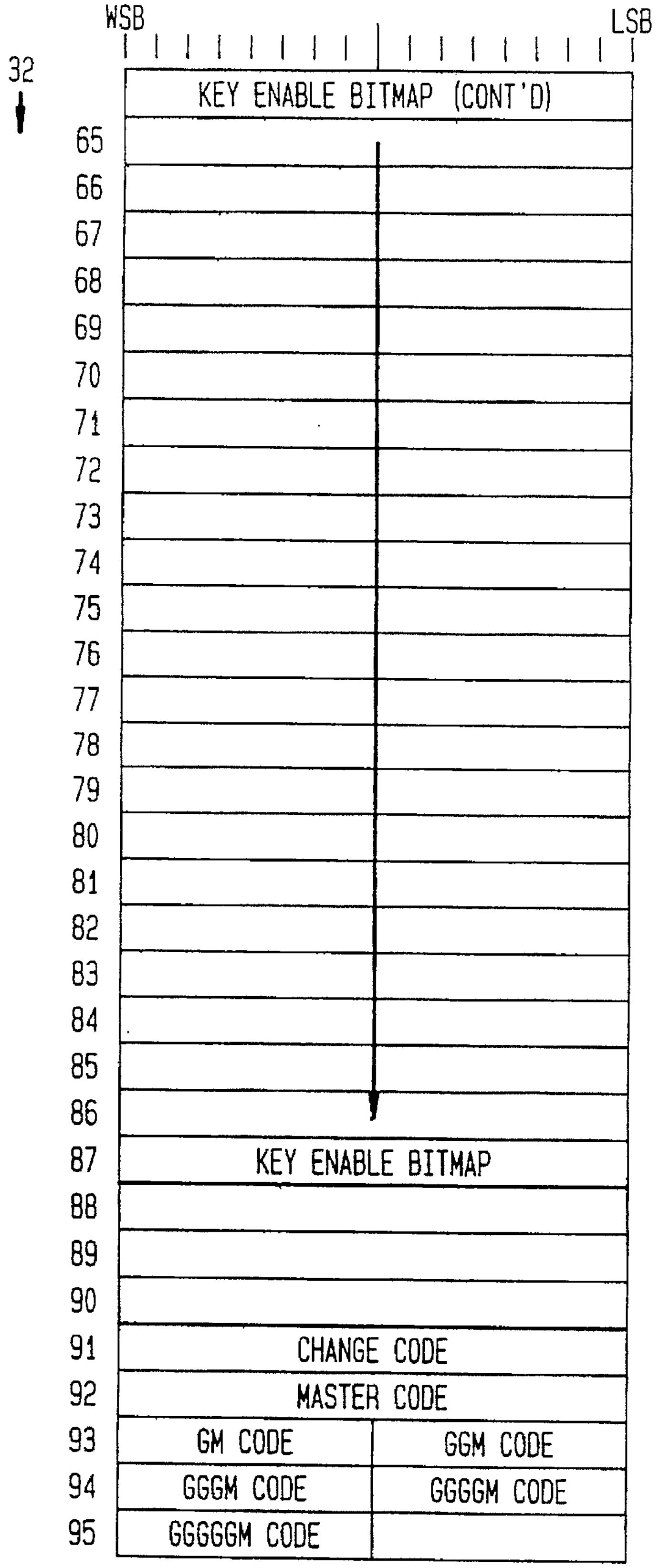
FIG. 27 shows in a condensed form for illustration purposes pages of memory of a NVRAM for the lock of FIG. 1.

As seen in FIG. 27, Words 32–87 of the lock NVRAM 34 form a Key Enable Map that is a bitmap for enabling individual copies of change keys for the lock 10. Each bit in this block of memory corresponds to a copy number. Bit 0 of word 32 corresponds to copy #1, Bit 1 of word 33 corresponds to copy #10, and so forth. If the bit is set to 1, the copy is authorized to activate the lock 10. If the bit is set to 0, the copy is disabled. The illustrated embodiment allows for 896 copies (56 words times 16 bits/word).

Words 88–90 of the lock NVRAM 34 are not used in the illustrated embodiment.

Words 91–95 of the lock NVRAM 34 are Master levels that are words which contain the lock's security hierarchy (master level) codes. A description of the format will be provided later.

Figure 28:
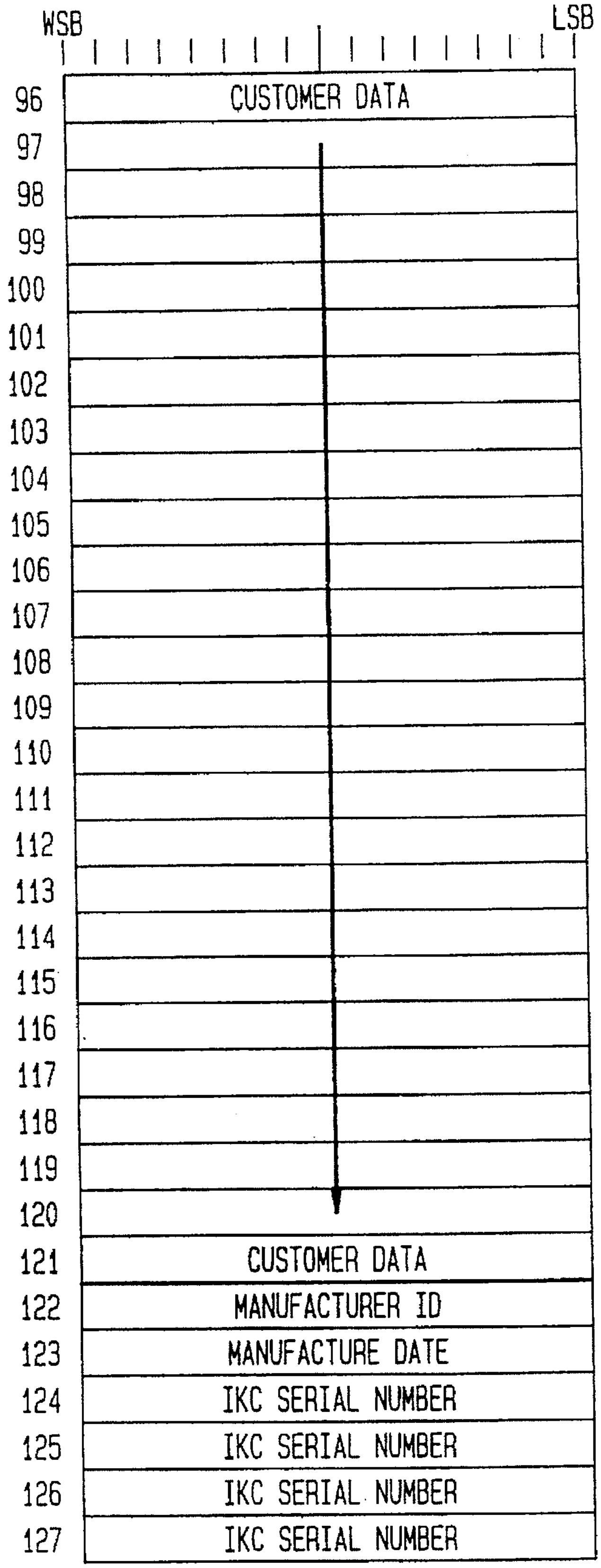
FIG. 28 shows another memory page of the NVRAM of the lock of FIG. 1.

FIG. 28 shows Words 96–121 of the lock NVRAM 34. These Words are Customer Data words that contain tracking information programmed at the various levels of lock distribution. This information is used in conjunction with the Customer Code Size field to determine if a lock 10 and a key 12 belong to the same end customer. A description of the format of this field will be provided later.

Word 122 of the lock NVRAM 34 is a Manufacturer ID word that contains a 16-bit code identifying the electronics manufacturer which produced the lock hardware. The values for these codes are assigned by the manufacturer and programmed into the lock NVRAM 34 during the manufacturing process.

Word 123 of the lock NVRAM 34 is a Manufacturing Date, a word that contains a 16-bit code indicating the manufacturing date for the lock electronics. A description of the format for the Manufacturing Date will be provided later.

Words 124–127 of the lock NVRAM 34 is an IKC Serial Number that are words which contain a 64-bit identification code that uniquely identifies the lock hardware in a master data base kept by the lock manufacturer. These values will be assigned by the lock manufacturer and issued in blocks to manufacturers of the lock electronic components.

Figure 29:
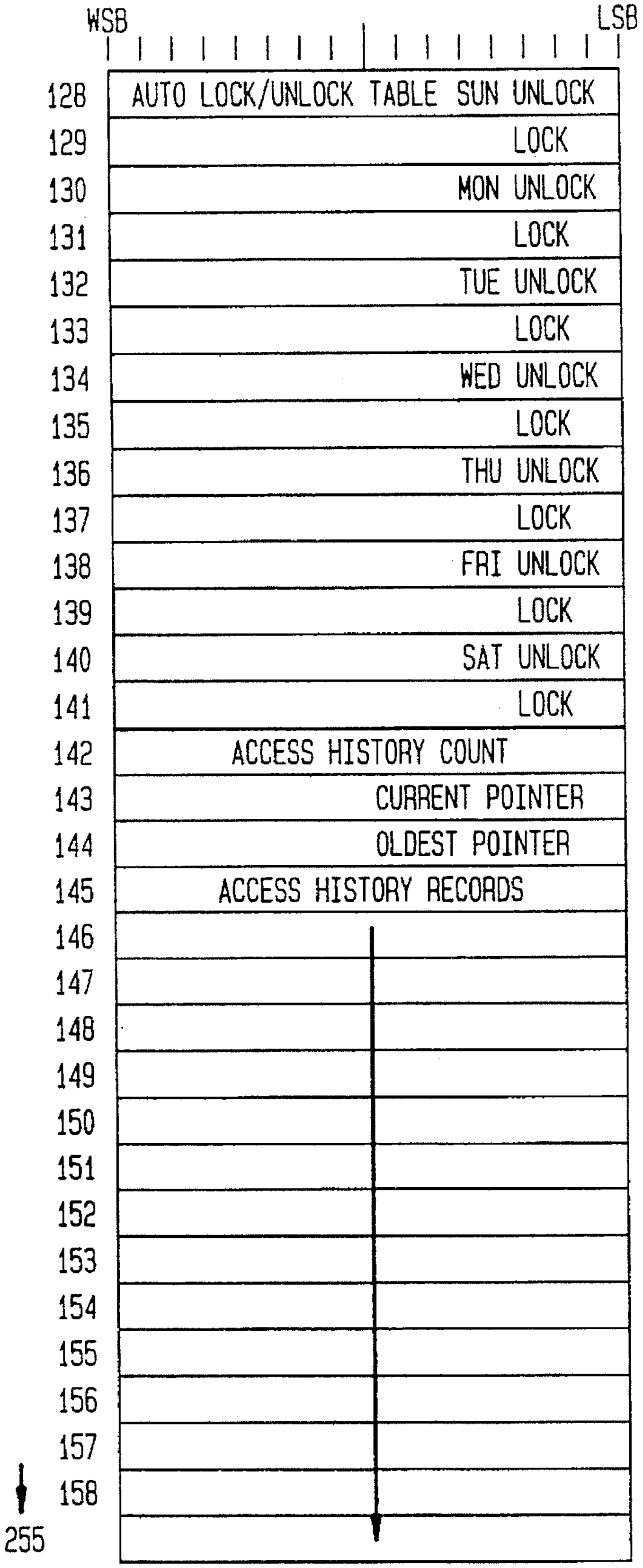
FIG. 29 shows in a condensed form for illustration purposes the last pages of memory of the NVRAM of the lock of FIG. 1.

FIG. 29 illustrates the remaining four pages of the lock NVRAM 34 in an abbreviated fashion for illustration purposes. It should be remembered that every page in the lock NVRAM 34 has thirty-two words.

Words 128–141 of the lock NVRAM 34 are the Auto Lock/Unlock times which is a table that has the same format as the Timed Access Tables (described later) and contains the times of day at which the lock 10 is to automatically unlock or relock itself. This feature must be enabled through the EALU feature field.

The remaining Words 142-end of the lock NVRAM 34 are the Access History Records. (In the illustrated embodiment, the end Word is Word 255). This area is reserved for storage of access history records. The size of this area depends on the total amount of NVRAM installed in the lock 10. The record format is described later.

The following is a description of the code mapping of the key NVRAM 59. This mapping is for illustrative purposes only, as other arrangements of the mapping and additional features can be provided.

The minimum acceptable size of the key NVRAM 59 is 2048 bits (2 Kb). This size ensures that all basic necessary features of the key 12 and key security are met. The increase of the NVRAM size will increase the number of allowable key pages assignable to a single key, i.e. the key's ability to record more than one set of accessible lock combinations (such as opening a door lock and a car lock). The memory size information is recorded in the feature field of the key NVRAM 59.

For keys with extended memory configured as multiple or "universal" keys, the word numbers given for the parameters will be relative to the beginning of the NVRAM space assigned to each key image within the NVRAM. That is, the NVRAM space may be thought of as a series of smaller NVRAMs, each starting at Word 0. For example, if a key 12 has 16 Kbytes of memory configured as eight 2 Kbyte keys, there will be eight Expiration Date Fields, each stored in the fifth and sixth words of the first NVRAM page of the appropriate key.

When determining if a key is authorized, the lock 10 interrogates the first key space, and attempts to match the key ID with the ID of the lock 10. If the two do not match, and the Multi-key Pointer Field is not set to zero, the lock 10 proceeds to the next key space indicated by the Multi-key Pointer. Then the interrogation is performed in the manner identical to the previous one. This process is repeated until either an authorized key space is found and access is granted, or the lock 10 encounters a Multi-key Pointer Field set to zero and access is denied.

Figure 30:
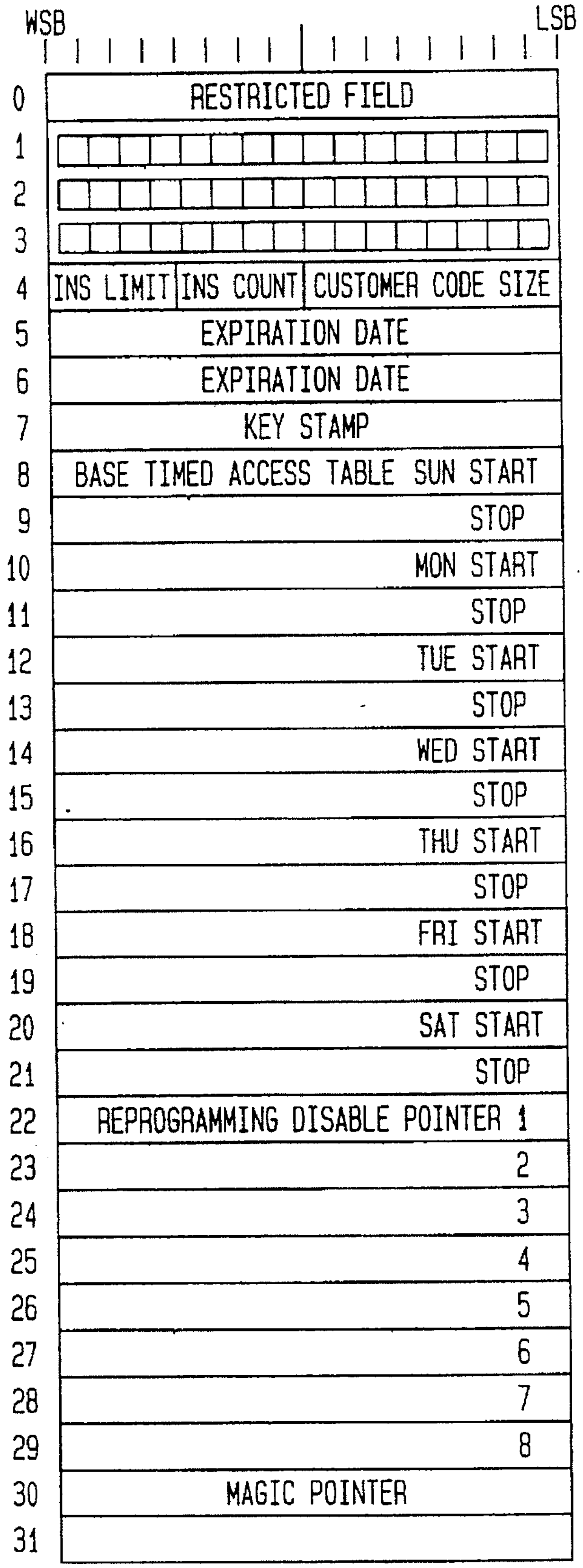
FIG. 30 shows the code allocation for the first page of memory of the NVRAM for the key of FIG. 3.

FIG. 30 illustrates page 0 of the key NVRAM 59. Word 0 of the key NVRAM 59 is reserved for encoding by the manufacturer of a restricted field. This word is not subject to transmission under any circumstances and is verified by the code embedded in the microprocessor 57 of the key 12.

Words 1–3 of the key NVRAM 59 comprise a set of bit-encoded feature fields which enable or disable various capabilities in the key 12. The following is a description of these fields.

The Memory Size Field (MSZ2:MSZ0) is a field that indicates the total amount of NVRAM memory, in Kbytes, installed in the key 12. A value of 0 indicates 16 Kbytes.

The Enable Duplication Flag (EDUP) is a flag, when set to a 1, that enables duplication of the key 12. Otherwise, the key 12 cannot be duplicated.

The Enable Key Expiration Date Flag (EEXP) is a flag, if set to 1, that enables key expiration after date programmed in the key NVRAM Words 5 and 6.

The Enable Illegal Insertion Count Flag (EIIC) is a flag, if set to 1, that enables the Illegal Insertion Counter of the key 12 and indicates that the Illegal Insertion Limit field has been programmed.

The Counter Function Field (ICT1:ICT0) is a flag bit field that indicates to the key 12 whether the Illegal Insertion Count is to be decremented, cleared, or kept frozen upon every legal key insertion. This contents of this field are valid only if the EIIC flag is set.

The Enable Timed Access Flag (ETIM) is a flag, when set, which indicates that the Timed Access feature is enabled in the key 12. If the key 12 has the minimum NVRAM size installed, all Timed Access checks use the table in NVRAM page 0 (Words 7–20). If the key 12 has additional memory, Timed access checks for access codes 2–8 use the tables pointed to by the Extended Timed Access Pointer (described later).

The Special Key Functions Field (SKF2:SKF0) is a field that indicates that the key 12 is configured for special operations. The lock 10 will take appropriate action based on the function of the key 12. The key 12 can be programmed with at least three functions that are: no special functions programmed; a Shutout/Display key; or a one time access key.

The Emergency Key Flag (EMKY) is a flag, when set, which indicates that the key 12 may override special lock functions such as Shutout or Display mode.

The first field of Word 2 is the Multi-key Pointer Field (MKY4:MKY0). If not set to 0, this field points to the key NVRAM page where the next key space begins.

The Enable Anti-Passback Flag (EAPB), when set, enables the Anti-Passback feature in the key 12.

The Last Passback Direction (LPBD) is a flag that, if the EAPB flag is set, will be set by the lock 10 to indicate the last access direction (in or out) for which the key 12 was used.

The Extended Timed Access Pointer (ETA4:ETA0) is a field, if not set to 0, that points to the page which contains the Extended Timed Access tables for access codes 2–8. In the illustrated embodiment of the invention, this field must be set to either 0, to indicate that Extended Timed Access is disabled, or to 4 to indicate that the ETA starts on page 4.

Word 3 contains the Personal Record Pointer Field (PER4:PER0). This field, if not set to 0, indicates the memory page where personal data, such as credit card numbers, access codes, PINs, etc. are located.

The Feature Field Extension Pointer Field (FES3:FES0) contains the byte count of an optional feature extension field "FE" placed immediately below the lowest addressed byte of a Customer Data field. The "FE" field provides the capability of expanding the existing Feature field, should there be any need for an extension of key functionality resulting from changes to the firmware of the microprocessor 57. If all the bits of the Feature Extension Size Field are set to 0, no feature field expansion is implemented.

Word 4 of the key NVRAM 34 comprises three separate fields. The first of these fields is the Illegal Insertion Count Field (IIC) which holds the current number of illegal insertions recorded for the key 12. This number is incremented by the lock 10 upon every entry attempt into an unauthorized lock, if such an illegal entry retention is preprogrammed in the EIIC feature field of the key. The IIC counter may either be decremented upon a consecutive legal entry, or cleared to zero, or kept current. The type of action taken by the lock 10 depends on the status of the ICT1:ICT0 bits in the feature field of the key 12.

The Illegal Insertion Limit Field (IIL) holds a preprogrammed limit of illegal insertions that the key 12 is allowed to make before a lock 10 will take action. This limit is compared against the illegal insertion count specified in the IIC field upon every illegal entry attempt. If the two match, the lock 10 takes the action specified by the ICT1:ICT0 feature bits.

The Customer Code Size field indicates the size, in bytes, of the Customer Data Field. Its value is two less than the number of bytes of data which must match between the lock 10 and key 12 to establish that both components belong to the same end customer. The extra two bytes are the Manufacturer ID field which is located immediately after the highest addressed byte of customer data. The Customer Data Field will be described later.

Words 5 and 6 of the key NVRAM 59 is the Expiration date which are words dedicated to the storage of the key expiration date. If this feature is enabled through the EEXP feature field, the key 12 will not be allowed to activate any lock 10 after the programmed date.

Word 7 of the key NVRAM 59 is the Key Stamp, which is a field that holds the value which identifies the key 12 within the customer installation. This is the value which is recorded by the lock 10 when the Illegal Insertion Limit is exceeded.

Words 8–21 form the Timed Access Table. These words contain the key's basic Timed Access Table. If the key 12 does not have the Extended Timed Access feature enabled, then this table is applied to all Timed Accesses. If Extended Timed Access is enabled, then this table applies to the key's first access area.

Words 22–29 of the key NVRAM 59 are the Reprogramming Disable Pointers, which are eight automatic reprogramming pointers. The value contained in each word corresponds to the key copy(s) to be disabled when the corresponding copy number indicated in the Master keying data field is enabled. A description of the format will be provided later. These words are also used for storing the lock identity and date/time information when the Illegal Insertion Count is exceeded.

Word 30 of the key NVRAM 59 is a Programming Pointer that is used during key programming or reprogramming. This pointer is the address of the key NVRAM 57 location up to which (inclusive) the key microprocessor 59 is allowed to reprogram the contents of the key NVRAM 57. The condition for reprogramming is that the value of the programming pointer of the lock 10, or programmer at least match (or exceed) that of the key 12. Otherwise, the request to reprogram is denied.

Consequently, in the initial process of programming locks 10 and keys 12 that have never been programmed, the value of this programming pointer is continuously decremented. This preserves the hierarchy of the distribution system and ensures unique identities of the distributed keys 12 and locks 10. In the process of reprogramming, the programming device establishes the new value of the programming pointer for the key 10 which, however, can never exceed that of the programming device.

In the illustrated embodiment of the present invention, Word 31 is not used.

FIGS. 31 and 32 illustrate Words 32–79 of the key NVRAM 59. These words contain the Master keying data, which include eight Master keying data tables, corresponding to the key's eight access areas. The lock 10 scans each of these tables to try to find a match. The format of this data will be described later.

Words 80–95 are the Holiday Exclusion Dates, and these words contain up to 16 holiday dates. For these dates the access is denied even within the time limits otherwise allowed by the Timed Access tables.

Figure 33:
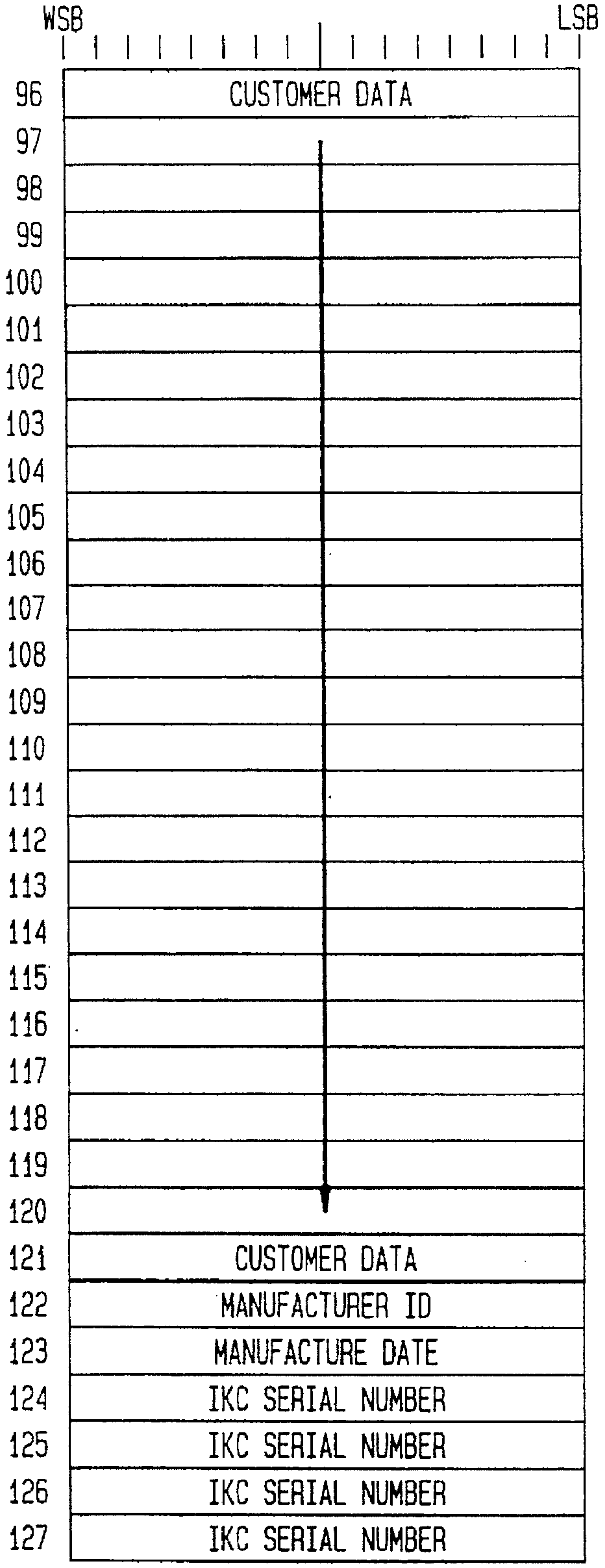
FIG. 33 shows the fourth page of memory for the NVRAM of the key of FIG. 3.

FIG. 33 shows Words 96–121 of the key NVRAM 59. These Words are Customer Data words that contain tracking information programmed at the various levels of key distribution. This information is used in conjunction with the Customer Code Size field to determine if a lock 10 and a key 12 belong to the same end customer. A description of the format of this field will be provided later.

Word 122 of the key NVRAM 59 is a Manufacturer ID word that contains a 16-bit code identifying the electronics manufacturer which produced the key hardware. The values for these codes are assigned by the manufacturer and programmed into the key NVRAM 59 during the manufacturing process.

Word 123 of the key NVRAM 59 is a Manufacturing Date, a word that contains a 16-bit code indicating the manufacturing date for the key electronics. A description of the format for the Manufacturing Date will be provided later.

Words 124–127 of the key NVRAM 59 is an IKC Serial Number that are words which contain a 64-bit identification code that uniquely identifies the key hardware in a master data base kept by the key manufacturer. These values will be assigned by the key manufacturer and issued in blocks to manufacturers of the key electronic components.

The following fields are available in keys 12 with an extended NVRAM memory 59. These are shown in FIGS. 34–36.

Words 128–225 of the ksy NVRAM 59 are Extended Timed Access field. For keys with the Extended Timed Access Feature enabled (Feature field ETA3:ETA0 not set to 0), these words contain 7 additional Timed Access Tables to correspond to the key's access areas 2–8.

In the illustrated embodiment of the present invention, Words 226–255 are not used.

Although not shown in the figures, a key 12 with an extended key NVRAM 59 will have a Personal Data Retention field that starts on the page indicated by the PER4:PER0 pointer in the key feature field. The size and structure of this field is still to be defined.

The following is a description of the format in which data is stored in the various fields.

The Customer Data field comprises up to thirteen two-word subfields, each of which contains values assigned at various levels of distribution. These values are customer dependent, but will typically be serial numbers, lot numbers, or other tracking information. The Customer Data area is filled in starting from higher addresses and working downward. The first location used is immediately below the Manufacturer ID field.

The Programming Pointer field indicates the total number of bytes in the Customer data area which have been programmed. The Customer Code Size field indicates the number of bytes in the Customer data area which must compare between the lock and key for the key to be allowed access to the lock.

Timed Access Tables are stored as a block of 14 words, with word 0 being the Enable access time for Sunday, word 1 being the Disable access time for Sunday, word 2 being the Enable access time for Monday, etc. The Enable access time and Disable access time values indicate, with 2 second resolution, the beginning and end of the legal access windows for each day of the week. These values are stored as 16-bit numbers indicating the number of 2-second intervals since midnight. Thus, midnight is represented by the value 0, 1:00 am by 1800, and 11:59:58 pm by 43,199.

There are two special values used in representing access times. If one of these values is present in the Enable access time field, the Disable access time field is ignored. The first of these values is: 65535 (FFFFh)=no restriction for this day; and the second of these values is: 65534 (FFFEh)=no access allowed on this day.

The expiration date field is stored in the real-time clock/calendar format of the lock 10. This format is a 32-bit value representing the number of seconds since midnight, Jan. 1, 1990. The expiration date is stored as the number of seconds for 23:59:59 on the selected date.

The entries in the Master keying table indicate the hierarchy structure for the lock system. Every lock 10 must have a Change code assigned to it. This is the lowest level of the hierarchy system, and is adequate for many systems. If the Change code is the only value used to identify locks 10 and keys 12, the system is said to be "flat"—i.e. no hierarchy structure. Additional levels of mastering may be added to increase the security and flexibility of the system.

Both the lock NVRAM 34 and the key NVRAM 59 have similar Master keying tables. The lock 10 has one table which defines its identity completely. The key 12 has eight tables, one corresponding to each of its access areas. Each key table has an extra entry not present in the lock table, known as the Copy number field. This field allows multiple copies of a key 12 with the same Change code. Each of these copies must be enabled in the Key Enable Map of the lock 10 before the key 12 is authorized to activate the lock 10.

These levels of Mastering include, for example, seven levels of hierarchy. These are: Change Code, Master Code, Grandmaster Code, Great-Grandmaster Code, . . . to Great-great-great-great-great-Grandmaster Code. The two lowest levels, the Change Code and the Master Code, have 16 bits to contain any value from 0 to 65534 to indicate a valid level. The higher levels have eight bits to contain any value from 1 to 254 to indicate a valid level.

The Master code and higher levels may contain two special values: all zeros, which indicates that this level in the hierarchy is ignored; and all ones which indicates that there are no higher levels.

A Copy number field of the Master keying table in the key 12 may contain values 1–32767 to indicate valid copy numbers. If the MSB (bit 15) of this field is set, it indicates to the lock 10 that the key 12 is to be enabled using the "Automatic Reprogramming" feature. If this is the case, the lock 10 enables the copy number specified in bits 0–14 of the Copy number field, then clears the MSB. The lock 10 then reads the Reprogramming Disable Pointer corresponding to the access area for the key 12 to determine which copy number to disable. The Reprogramming Disable Pointer may contain the following values: 1–32767, which indicates a copy number to be disabled; 0, which indicates don't disable any copies; and 65535, which indicates disable all other copies.

In a Holiday Exclusion Table, the date for each holiday is stored as a 16-bit value formatted as follows: the binary value of the month, 1–12; and the binary value of the day, 1–31. Any unused table entries will have all of their bits set to 0.

For Daylight Savings Time Adjustment, the date and time for each adjustment is stored as a 16-bit value formatted as follows: a Done Flag, when set to 1, which indicates that adjustment has been done; a binary value of the hour, 0–23; a binary value of the month, 1–12; and a binary value of the day, 1–31. If the DST Adjustment feature is not active, both words will have all of their bits set to 1.

The manufacturing date is stored as a 16-bit value representing the number of days since Jan. 1, 1990. Thus, Jan. 2, 1990 would be represented by the value 1, and Jan. 1, 1991 by 365.

The format of the Access History Records is as follows. The first three words of the Access History area are reserved for pointers to the access history data. The first pointer is the Count pointer which points to the number of valid records. The second pointer is the Current pointer, which points to the address for writing the next record. The third pointer is the Oldest pointer, which points to the address of the oldest record in the list.

The individual access history records may have three different formats, depending on the resolution selected for storing the time data (TRS1:TRS0 lock feature fields). These formats are: TRS1:TRS0=00, in which no time information is saved; TRS1:TRS0=01, in which full date and time information is saved; and TRS1:TRS0=10, in which only the date is saved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An electronic lock and key system for selectively operating a locking device comprising:

an electronic lock circuit contained within said electronic lock and which is operative to controllably actuate said locking device, said electronic lock circuit including a first microprocessor and a first communications transceiver unit coupled with said first microprocessor, said first communications transceiver unit being operative, under control of said first microprocessor, to transmit a first encrypted communication signal sequence to said key; and an electronic key circuit contained within said key and including a second microprocessor and a second communications transceiver unit coupled with said second microprocessor, said second communications transceiver unit being operative to receive a first encrypted communication signal sequence transmitted to said electronic key circuit by said electronic lock circuit, said second microprocessor being operative to deencrypt said first encrypted signal sequence and to perform a first prescribed task in response to deencryption of said first encrypted signal sequence, and wherein said electronic key circuit contains reprogrammable memory, associated with and accessible by said second microprocessor, which stores information representative of the ability of said electronic key circuit to access said electronic lock circuit for controllably actuating said locking device, and wherein said electronic lock circuit contains a power supply unit which supplies power to said electronic key circuit for operating said electronic key circuit, and wherein said power supply unit of said electronic lock circuit is configured to be coupled to and supply power to said electronic key circuit via first and second terminals, so that said second microprocessor and said second transceiver unit of said electronic key circuit may receive power from said electronic lock circuit for their operation, and wherein said electronic lock circuit contains an electrical current sense and monitoring circuit that is operative to sense and monitor an electrical condition of said first and second power supply terminals and, in response to detecting a magnitude of said electrical condition falling within a prescribed range of values, enabling the transmission and processing of communication signal sequences between said electronic key circuit and said electronic lock circuit.

2. An electronic lock and key system according to claim 1, wherein said electrical current sense and monitoring circuit is operative to monitor current flow between said first and second power supply terminals during periodically occurring current measurement intervals and, in the absence of the magnitude of said current falling within a prescribed range of values during a respective current measurement interval, effectively maintaining said electronic lock unit in a powered down mode.

3. An electronic lock and key system according to claim 2, wherein said electrical current sense and monitoring circuit is operative, in response to the magnitude of said current falling within a prescribed range of values during a respective current measurement interval, for powering up said electronic lock circuit and enabling the transmission and processing of communication signal sequences between said electronic lock circuit and said electronic key circuit.

4. An electronic lock and key system according to claim 1, further including an auxiliary power supply external to said electronic lock circuit which is operative to supply power to said system in response to the power supply capability of said power supply unit being less than a prescribed power supply level.

5. An electronic lock and key system for selectively operating a locking device comprising:

an electronic lock circuit contained within said electronic lock and which is operative to controllably actuate said locking device, said electronic lock circuit including a power supply unit, which supplies power to a normally unpowered electronic key circuit contained in said key, when said key is coupled with said electronic lock circuit, and a first microprocessor and a first communications transceiver unit coupled with said first microprocessor, said first communications transceiver unit being operative, under control of said first microprocessor, to transmit a first encrypted communication signal sequence to said electronic key circuit within said key; and an electronic key circuit contained within said key and including a normally unpowered second microprocessor and a second communications transceiver unit coupled with said second microprocessor, said second communications transceiver unit being operative, once powered by said power supply unit of said electronic lock, to receive a first encrypted communication signal sequence transmitted to said electronic key circuit by said electronic lock circuit, said second microprocessor being operative, once powered by said power supply unit of said electronic lock, to deencrypt said first encrypted signal sequence and to perform a first prescribed task in response to deencription of said first encrypted signal sequence, and wherein said electronic key circuit contains reprogrammable non-volatile memory, associated with and accessible by said second microprocessor, which stores information representative of the ability of said electronic key circuit to access said electronic lock circuit for controllably actuating said locking device, and wherein said power supply unit of said electronic lock circuit is configured to be coupled to and supply power to said electronic key circuit via first and second terminals, so that said second microprocessor and said second transceiver unit of said electronic key circuit may receive power from said electronic lock circuit for their operation, and wherein said electronic lock circuit contains an electrical current sense and monitoring circuit that is operative to sense and monitor an electrical condition of said first and second power supply terminals and, in response to detecting a magnitude of said electrical condition falling within a prescribed range of values, enabling the transmission and processing of communication signal sequences between said electronic key circuit and said electronic lock circuit.

6. An electronic lock and key system according to claim 5, wherein said electrical current sense and monitoring circuit is operative to monitor current flow between said first and second power supply terminals during periodically occurring current measurement intervals and, in the absence of the magnitude of said current falling within a prescribed range of values during a respective current measurement interval, effectively maintaining said electronic lock unit in a powered down mode.

7. An electronic lock and key system according to claim 6, wherein said electrical current sense and monitoring circuit is operative, in response to the magnitude of said current falling within a prescribed range of values during a respective current measurement interval, for powering up said electronic lock circuit and enabling the transmission and processing of communication signal sequences between said electronic lock circuit and said electronic key circuit.

8. An electronic lock and key system according to claim 5, further including an auxiliary power supply external to said electronic lock circuit which is operative to supply power to said system in response to the power supply capability of said power supply unit being less than a prescribed power supply level.

* * * * *